United States Patent
Conte et al.

(10) Patent No.: US 10,167,788 B2
(45) Date of Patent: Jan. 1, 2019

(54) METHOD OF CONTROLLING THE OPERATION OF AN AIR CHARGING SYSTEM OF AN INTERNAL COMBUSTION ENGINE

(71) Applicant: GM GLOBAL TECHNOLOGY OPERATIONS LLC, Detroit, MI (US)

(72) Inventors: Giuseppe Conte, Turin (IT); Carmen Pedicini, Turin (IT); Vincenzo Alfieri, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 14 days.

(21) Appl. No.: 15/289,497

(22) Filed: Oct. 10, 2016

(65) Prior Publication Data

US 2017/0101946 A1    Apr. 13, 2017

(30) Foreign Application Priority Data

Oct. 12, 2015    (GB) .................................. 1518006.0

(51) Int. Cl.
*F02D 41/00* (2006.01)
*F02B 37/22* (2006.01)
(Continued)

(52) U.S. Cl.
CPC .......... *F02D 41/0007* (2013.01); *F02B 37/22* (2013.01); *F02D 21/08* (2013.01); *F02D 23/00* (2013.01); *F02D 33/02* (2013.01); *F02D 41/0002* (2013.01); *F02D 41/005* (2013.01); *F02D 41/0052* (2013.01); *F02D 41/0077* (2013.01); *F02D 41/18* (2013.01);
(Continued)

(58) Field of Classification Search
CPC ............ F02D 41/0007; F02D 41/0052; F02D 41/0077; F02D 41/18; F02D 41/26; F02B 37/22
USPC .................................................. 701/103, 108
See application file for complete search history.

(56) References Cited

U.S. PATENT DOCUMENTS 7,025,040 B2    4/2006   Hoshino et al.
7,031,824 B2    4/2006   Gangopadhyay
(Continued)

OTHER PUBLICATIONS

Great Britain Patent Office, Great Britain Search Report for Great Britain Application No. 1518006.0, dated Apr. 18, 2016.
(Continued)

*Primary Examiner* — Mahmoud Gimie
(74) *Attorney, Agent, or Firm* — Lorenz & Kopf, LLP

(57) ABSTRACT

A method and apparatus is disclosed to control the operation of an air charging system of an internal combustion engine. A plurality of output parameters of the air charging system are monitored. An error is calculated between the monitored output parameters and a target value thereof. The calculated errors are applied to a linear controller that yields a virtual input used to calculate a plurality of input parameters for the air charging system. The input parameters is used to determine the position of a corresponding actuator of the air charging system for operating the actuators according to the determined position thereof. The inputs parameters are calculated with a non-linear mathematical model of the air charging system configured such that the virtual inputs are in a linear relation with only one of the output parameters and vice versa.

14 Claims, 7 Drawing Sheets

(51) Int. Cl.
F02D 21/08 (2006.01)
F02D 23/00 (2006.01)
F02D 33/02 (2006.01)
F02D 41/18 (2006.01)
F02D 41/26 (2006.01)
F02D 41/14 (2006.01)

(52) U.S. Cl.
CPC .......... F02D 41/26 (2013.01); *F02D 41/0072* (2013.01); *F02D 41/1445* (2013.01); *F02D 2041/143* (2013.01); *F02D 2041/1433* (2013.01); *F02D 2200/0402* (2013.01); *Y02T 10/144* (2013.01); *Y02T 10/42* (2013.01); *Y02T 10/47* (2013.01)

(56) References Cited

U.S. PATENT DOCUMENTS

| | | |
|---|---|---|
| 7,389,173 B1 | 6/2008 | Wang |
| 7,512,479 B1 | 3/2009 | Wang |
| 7,784,451 B2 | 8/2010 | Chi |
| 8,108,123 B2 | 1/2012 | Sarlashkar et al. |
| 8,640,679 B2 | 2/2014 | Wang et al. |
| 2009/0007888 A1 | 1/2009 | Sarlashkar et al. |
| 2010/0292907 A1 | 11/2010 | Sarlashkar et al. |
| 2011/0041493 A1 | 2/2011 | Doering et al. |
| 2012/0291534 A1 | 11/2012 | Wang et al. |
| 2013/0074496 A1 | 3/2013 | Chi et al. |
| 2014/0060506 A1 | 3/2014 | Shaver |
| 2014/0109570 A1* | 4/2014 | Hu ............... F02D 41/0007 60/605.1 |
| 2014/0123966 A1* | 5/2014 | Ide ............... F02D 21/08 123/568.21 |
| 2015/0337720 A1* | 11/2015 | Cattani ............... F02B 37/24 60/605.1 |
| 2015/0345412 A1 | 12/2015 | Conte et al. |
| 2015/0354483 A1* | 12/2015 | Brewbaker ............... F02M 26/06 60/605.2 |

OTHER PUBLICATIONS

Thermodynamics—Basic Concepts—Durham College. Aug. 3, 2011. p. 2.
Jung, H., Jin, H., Choi, S., and Ko, M., "Modeling and Control of Single Turbocharger with High Pressure Exhaust Gas Recirculation Diesel Engine," SAE Technical Paper 2013-01-2649, 2013, doi:10.4271/2013-01-2649. http://papers.sae.org/2013-01-2649/.

* cited by examiner

METHOD OF CONTROLLING THE OPERATION OF AN AIR CHARGING SYSTEM OF AN INTERNAL COMBUSTION ENGINE

CROSS-REFERENCE TO RELATED APPLICATION

This application claims priority to Great Britain Patent Application No. 1518006.0, filed Oct. 10, 2015, which is incorporated herein by reference in its entirety.

TECHNICAL FIELD

The present disclosure pertains to a method of controlling the operation of an air charging system of an internal combustion engine, for instance an internal combustion engine of a motor vehicle.

BACKGROUND

During the operation of the engine, the actuators of the air charging system, such as the EGR valve actuator(s), the VGT actuator and the intake valve actuator, are used to regulate a number of important output parameters of the air charging system, for example the pressure inside the intake manifold, the oxygen concentration inside the intake manifold and the pressure inside the exhaust manifold, according to performance and emissions requirements.

It is known that an internal combustion engine is equipped with an air charging system provided for supplying air into the combustion chambers. The air charging system basically includes an intake pipe that conveys air from the ambient environment to an intake manifold in fluid communication with the combustion chambers. In the intake pipe there may be an intake valve having an actuator arranged to move a valve member that regulates the mass flow rate of the air, and a compressor provided for increasing the pressure of the air in the intake manifold. The compressor may be driven by a turbine that rotates by receiving exhaust gasses from an exhaust manifold in fluid communication with the combustion chambers. In order to regulate the rotational speed of the compressor, the turbine may be a variable geometry turbine (VGT) having an actuator arranged to alter the angular position of the turbine vanes. The air charging system may further include one or more exhaust gas recirculation (EGR) pipes for recirculating a portion of the exhaust gasses from the exhaust manifold back into the intake manifold. Each EGR pipe is generally provided with an EGR valve having an actuator arranged to move a valve member that regulates the mass flow rate of the recirculated exhaust gasses.

To perform this function, these actuators are conventionally controlled by an electronic control unit (ECU) according to separated and uncoordinated control strategies, which enable each individual actuator to be operated in any desired or required position, independently from one another. However, the effects generated on the output parameters by the actuators of the air charging system are generally strictly interdependent and have mutual interactions, so that the separated and uncoordinated control strategies may be affected by low accuracy, especially during fast transients. Moreover, this conventional control approach needs a vast calibration activity.

SUMMARY

The present disclosure provides a control strategy of the air charging system, which allows a coordinated and simultaneous adjustment of the actuator positions in order to compensate for their interactions, In this way a reliable control strategy is provided that needs less calibration effort and that shows a more accurate response during transients.

In particular, an embodiment of the present disclosure provides a method of controlling the operation of an air charging system of an internal combustion engine. A plurality of output parameters of the air charging system are monitored. An error is calculated between each one of the monitored output parameters and a target value thereof. Each one of the calculated errors is applied to a linear controller that yields a virtual input. The virtual inputs is used to calculate a plurality of input parameters for the air charging system. Each one of the input parameters is used to determine the position of a corresponding actuator of the air charging system. Each one of the actuators are operated according to the determined position thereof. The inputs parameters are calculated with a non-linear mathematical model of the air charging system configured such that each one of the virtual inputs is in a linear relation with only one of the output parameters and vice versa.

As a matter of fact, this control strategy provides for controlling the air charging system using a multi-input multi-output (MIMO) feedback linearization approach, which has the effect of allowing a simultaneous and coordinated control of the actuators while compensating for their interactions. This coordinated control strategy has good transient response and accuracy and improves the trade-off between engine performance and polluting emissions under any operating conditions. Being based on a mathematical model of the air charging system, this coordinated control strategy has the additional effect of reducing the calibration efforts.

According to a first option of the present disclosure, the actuators of the air charging system may include an actuator of an exhaust gas recirculation valve, an actuator of a variable-geometry turbocharger and an actuator of an air intake valve. This option allows a coordinated control of the main actuators of the air charging system, particularly when the air charging system includes just one EGR pipe and thus one EGR valve disposed in that pipe.

According to an aspect of this first option, the input parameters of the air charging system may include a parameter indicative of an exhaust mass flow rate through the exhaust gas recirculation valve, a parameter indicative of an air mass flow rate through the air intake valve, and a parameter indicative of an exhaust mass flow rate through a turbine of the variable-geometry turbocharger. This aspect allows a reliable implementation of the control strategy when the above identified actuators are involved.

In this case, the output parameters of the air charging system may include a parameter indicative of an exhaust manifold pressure, a parameter indicative of an intake manifold pressure and a parameter indicative of a residual gas fraction in the intake manifold. This aspect allows a reliable implementation of the control strategy when the above identified actuators and input parameters are involved.

According to a second option of the present disclosure, the actuators of the air charging system may include an actuator of a first exhaust gas recirculation valve, an actuator of a second exhaust gas recirculation valve, an actuator of a variable-geometry turbocharger and an actuator of an air intake valve. This option allows a coordinated control of the main actuators of the air charging system, particularly when the air charging system includes two EGR pipes and thus two EGR valves individually disposed in those pipes.

According to an aspect of this second option, the input parameters of the air charging system may include a parameter indicative of an air mass flow rate through the air intake valve, a parameter indicative of a flow effective area of the first exhaust gas recirculation valve, a parameter indicative of a power rate of a turbine of the variable-geometry turbocharger, and a parameter indicative of a flow effective area of the second exhaust gas recirculation valve. This aspect allows a reliable implementation of the control strategy when the above identified actuators are involved.

In this case, the output parameters of the air charging system may include a parameter indicative of a pressure within an intake manifold, a parameter indicative of a residual gas fraction in the intake manifold, a parameter indicative of a compression rate caused by a compressor of the variable-geometry turbocharger, and a parameter indicative of a residual gas fraction in an intake duct upstream of the compressor. This aspect allows a reliable implementation of the control strategy when the above identified actuators and input parameters are involved.

According to an alternative aspect of the second option, the input parameters of the air charging system may include a parameter indicative of an air mass flow rate through the air intake valve, a parameter indicative of a flow effective area of the first exhaust gas recirculation valve, a parameter indicative of a flow effective area of a turbine of the variable-geometry turbocharger, and a parameter indicative of a flow effective area of the second exhaust gas recirculation valve. Also this aspect allows a reliable implementation of the control strategy when the above identified actuators are involved.

In this case, the output parameters of the air charging system may include a parameter indicative of a pressure within an intake manifold, a parameter indicative of a residual gas fraction in the intake manifold, a parameter indicative of a pressure within an intake duct between a compressor of the variable-geometry turbocharger and the air intake valve, and a parameter indicative of a residual gas fraction in the intake duct upstream of the compressor.

Alternatively, the output parameters of the air charging system may include a parameter indicative of a pressure within an intake manifold, a parameter indicative of a residual gas fraction in the intake manifold, a parameter indicative of a pressure within an exhaust manifold, and a parameter indicative of a residual gas fraction in an intake duct upstream of the compressor.

Still alternatively, the output parameters of the air charging system may include a parameter indicative of a pressure within an intake duct between a compressor of the variable-geometry turbocharger and the air intake valve, a parameter indicative of a residual gas fraction in the intake manifold, a parameter indicative of a pressure within an exhaust manifold, and a parameter indicative of a residual gas fraction in an intake duct upstream of the compressor.

Any of these solutions has the effect of allowing a reliable implementation of the control strategy when the above identified actuators and input parameters are involved.

Another option of the present disclosure provides that the linear controllers may be proportional-integrative controllers or proportional-integrative-derivative controllers. This option has the effect of simplifying the linear control loop within the feedback linearization approach described above.

The method can be carried out with the help of a computer program including a program-code for carrying out all the steps of the method described above, and in the form of a computer program product including the computer program. The method can be also embodied as an electromagnetic signal, the signal being modulated to carry a sequence of data bits which represent a computer program to carry out all steps of the method.

Still another embodiment of the present disclosure provides an apparatus for controlling the operation of an air charging system of an internal combustion engine, wherein the apparatus is configured to monitor a plurality of output parameters of the air charging system, calculate an error between each one of the monitored output parameters and a target value thereof, apply each one of the calculated errors to a linear controller that yields a virtual input, use the virtual inputs to calculate a plurality of input parameters for the air charging system, use each one of the input parameters to determine the position of a corresponding actuator of the air charging system, and move each one of the actuators in the determined position thereof. The calculation of the virtual inputs uses a non-linear mathematical model of the air charging system configured such that each one of the virtual inputs is in a linear relation with only one of the output parameters and vice versa.

All these additional embodiments of the present disclosure basically achieve the same effects of the method disclosed above, particularly that of allowing a simultaneous and coordinated control of the actuators while compensating for their interactions. Naturally, any one of the options and/or aspects of the present disclosure which have been disclosed with regard to the method are applicable to each one of these additional embodiments.

Another embodiment of the present disclosure provides an electronic control unit for an air charging system of an internal combustion engine, wherein the electronic control unit is configured to monitor a plurality of output parameters of the air charging system, calculate an error between each one of the monitored output parameters and a target value thereof, apply each one of the calculated errors to a linear controller that yields a virtual input, use the virtual inputs to calculate a plurality of input parameters for the air charging system, use each one of the input parameters to determine the position of a corresponding actuator of the air charging system, and operate each one of the actuators according the determined position thereof, The electronic control unit is configured to calculate the virtual inputs with a non-linear mathematical model of the air charging system configured such that each one of the virtual inputs is in a linear relation with only one of the output parameters and vice versa.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
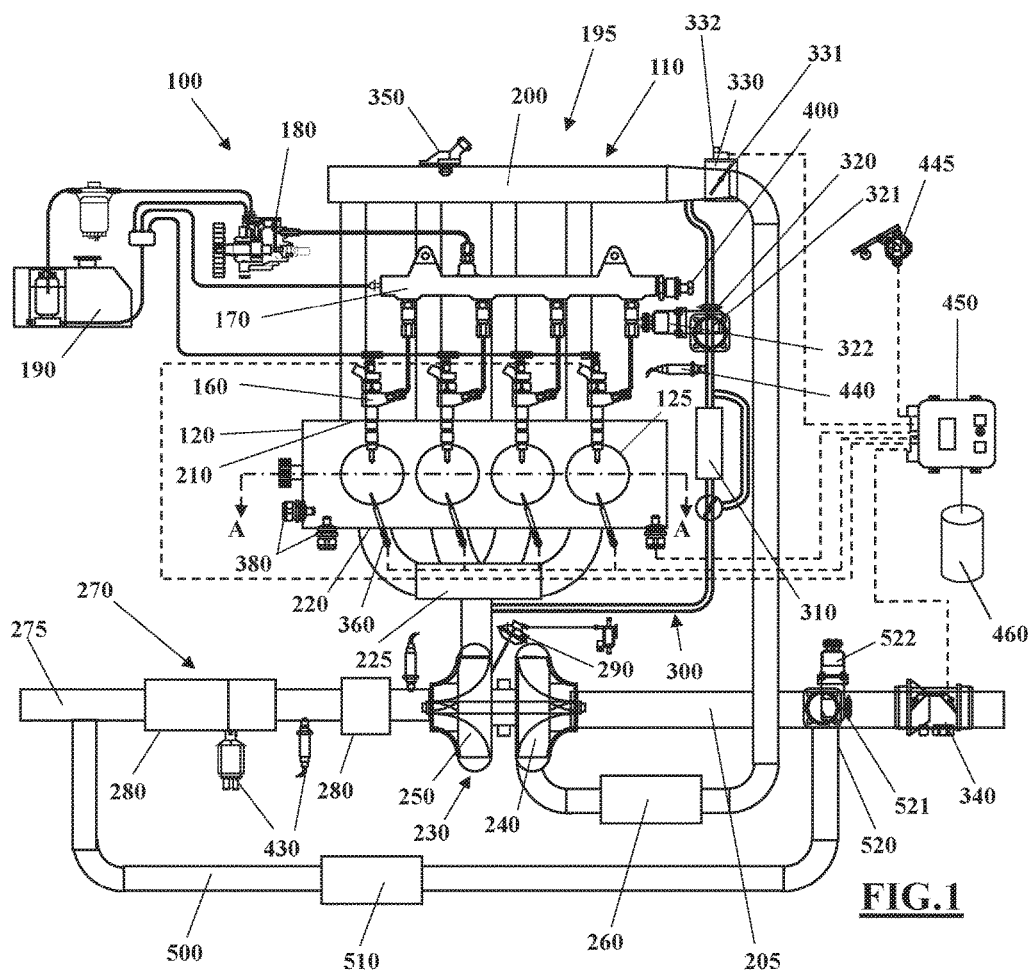
FIG. 1 schematically shows an automotive system.
Figure 2:
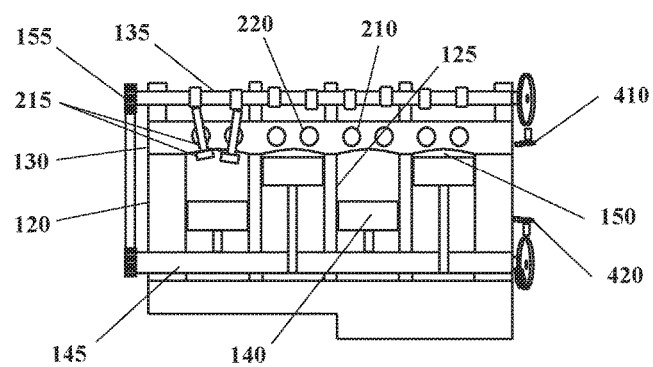
FIG. 2 is section A-A of FIG. 1.

Some embodiments may include an automotive system 100, as shown in FIGS. 1 and 2, that includes an internal combustion engine (ICE) 110, for example a compression-ignition engine (e.g. Diesel) or a spark-ignition engine (e.g. gasoline). The ICE 110 have an engine block 120 defining at least one cylinder 125 having a piston 140 coupled to rotate a crankshaft 145. A cylinder head 130 cooperates with the piston 140 to define a combustion chamber 150. A fuel and air mixture is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through an exhaust port 220. In some examples, a cam phaser 155 may selectively vary the timing between the camshaft 135 and the crankshaft 145.

The exhaust gasses coming from the combustion chamber 150 are directed into an exhaust system 270. The exhaust system 270 may include an exhaust manifold 225 in fluid communication with the exhaust port(s) 220, which collects the exhaust gasses and directs them into and exhaust pipe 275 having one or more exhaust aftertreatment devices 280. The aftertreatment devices 280 may be any device configured to change the composition of the exhaust gases. Some examples of aftertreatment devices 280 include, but are not limited to, catalytic converters (two and three ways), oxidation catalysts, lean NOx traps, hydrocarbon adsorbers, selective catalytic reduction (SCR) systems, and particulate filters.

The air may be provided to the air intake port(s) 210 through an air charging system 195. The air charging system 195 may include an intake manifold 200 in communication with the air intake port(s) 210. An air intake duct 205 may provide air from the ambient environment to the intake manifold 200. An intake valve 330 may be disposed in the intake duct 205. The intake valve 330 may include a movable valve member 331, for example a throttle body, and an electrical actuator 332 that moves the valve member 331 to regulate the mass flow rate of the air directed into the manifold 200.

The air charging system 195 may also include a variable-geometry turbocharger 230, having a compressor 240 rotationally coupled to a turbine 250, wherein the compressor is located in the intake duct 205 and the turbine in the exhaust pipe 275. Rotation of the compressor 240 increases the pressure and temperature of the air in the intake duct 205 and manifold 200. An intercooler 260, disposed in the intake duct 205 between the compressor 240 and the intake manifold 200, may reduce the temperature of the air. The turbine 250 rotates by receiving exhaust gases from the exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes of the turbine 250 to alter the flow of the exhaust gases through it.

The air charging system 195 may further include an exhaust gas recirculation (EGR) system for recirculating part of the exhaust gasses back into the combustion chambers 150. The EGR system may include a high-pressure EGR (HP-EGR) pipe 300 coupled between the exhaust manifold 225 and the intake manifold 200. More specifically, the HP-EGR pipe 300 branches from the exhaust manifold 225, or from a point of the exhaust pipe 275 located upstream of the turbine 250, and leads in a point of the intake duct 205 located downstream of the compressor 240, particularly between the intake manifold 200 and the intake valve 330. The HP-EGR pipe 300 may be provided with an HP-EGR cooler 310 to reduce the temperature of the exhaust gases flowing therein. An HP-EGR valve 320 may be disposed in the HP-EGR pipe 300. The HP-EGR valve 320 may include a movable valve member 321 and an electrical actuator 322 that moves the valve member 321 to regulate a mass flow rate of the exhaust gases in the HP-EGR pipe 300.

In some embodiments, the EGR system may further include a low-pressure EGR (LP-EGR) pipe 500 coupled between the exhaust manifold 225 and the intake manifold 200. More specifically, the LP-EGR pipe 500 branches from a point of the exhaust pipe 275 located downstream of the turbine 250, particularly downstream of the aftertreatment devices 280, and leads in a point of the intake duct 205 located upstream of the compressor 240. The LP-EGR pipe 500 may be provided with a LP-EGR cooler 510 to reduce the temperature of the exhaust gases flowing therein. A LP-EGR valve 520 may be disposed in the LP-EGR pipe 500. The LP-EGR valve 520 may include a movable valve member 521 and an electrical actuator 522 that moves the valve member 521 to regulate a mass flow rate of the exhaust gases in the LP-EGR pipe 500.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340 located in the intake duct 205 upstream of the LP-EGR valve 520, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an HP-EGR temperature sensor 440, and an accelerator pedal position sensor 445. Furthermore, the ECU 450 may generate output signals to various control devices that are arranged to control the operation of the ICE 110, including, but not limited to, the fuel injectors 160, the intake valve actuator 332, the HP-EGR Valve actuator 322, the LP-EGR valve actuator 522, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an on-board computer, or any processing module that might be deployed in the vehicle.

In greater details, the ECU 450 may be configured to control the actuators of the air charging system 195 using a feedback linearization approach, which may be based on a multi-input-multi-output (MIMO) non-linear mathematical model of the air charging system 195.

By way of example, assuming that the EGR system includes only one EGR pipe, for instance only the HP-EGR pipe 300, the actuators of the air charging system 195 include the intake valve actuator 332, the I-IP-EGR valve actuator 322 and the VGT actuator 290. Under this hypothesis, the input parameters of the air charging system 195 may include a parameter $W_{itv}$ indicative of the air mass flow rate through the intake valve 330, a parameter $W_{egr}$ indicative of the exhaust mass flow rate through the HP-EGR valve 320, and a parameter $W_{vgt}$ indicative of the exhaust mass flow rate through the turbine 250 of the variable-geometry turbocharger 230. The output parameters of the air charging system 195 may include a parameter $p_x$ indicative of an exhaust gas pressure within the exhaust manifold 225, a parameter $p_i$ indicative of an intake manifold pressure and a parameter $F_i$ indicative of a residual gas fraction in the intake manifold 200.

The MIMO non-linear mathematical model of the air charging system 195 may be defined by the following equations:

$$\dot{p}_i = \frac{dp_i}{dt} = \frac{\gamma R}{V_i}(W_{itv}T_{ic} + W_{egr}T_{egr} - W_{ei}T_i)$$

$$\dot{p}_x = \frac{dp_x}{dt} = \frac{\gamma R}{V_x}(W_{ex}T_{eout} - W_{egr}T_x - W_{vgt}T_x)$$

$$\dot{F}_i = \frac{dF_i}{dt} = \frac{(F_x - F_i)W_{egr} - F_iW_{itv}}{m_i}$$

Wherein:
γ is the ratio of specific heats,
R is the universal gas constant,
$V_i$ is an intake manifold inner volume,
$T_{ic}$ is an air temperature in the intake duct 205 downstream of the intercooler 260,
$T_i$ is an air temperature within the intake manifold 200,
$T_{egr}$ is a recirculated exhaust gas temperature,
$T_x$ is an exhaust gas temperature within the exhaust manifold 225,
$T_{eout}$ is a temperature of the exhaust gas exiting the ICE 110,
$V_x$ is an exhaust manifold volume,
$F_x$ is a residual gas fraction within the exhaust manifold 225,
$m_i$ is the overall mass of gasses within the intake manifold 200,
$W_{ei}$ is the overall mass flow rate of gasses entering the engine 110, and
$W_{ex}$ is the overall mass flow rate of gasses exiting the engine 110.

The MIMO non-linear mathematical model of the air charging system 195 may be equally defined by the following vector equation:

$$\begin{bmatrix} \dot{p}_i \\ \dot{p}_x \\ \dot{F}_i \end{bmatrix} = \begin{bmatrix} \frac{\gamma R}{V_i}(W_{itv}T_{ic} + W_{egr}T_{egr} - W_{ei}T_i) \\ \frac{\gamma R}{V_x}(W_{ex}T_{eout} - W_{egr}T_x - W_{vgt}T_x) \\ \frac{(F_x - F_i)W_{egr} - F_iW_{itv}}{m_i} \end{bmatrix} =$$

$$\begin{bmatrix} -\frac{\gamma R}{V_i}T_iW_{ei} \\ \frac{\gamma R}{V_x}T_{eout}W_{ex} \\ 0 \end{bmatrix} + \begin{bmatrix} \frac{\gamma R}{V_i}T_{ic} & \frac{\gamma R}{V_i}T_{egr} & 0 \\ 0 & -\frac{\gamma R}{V_x}T_x & -\frac{\gamma R}{V_x}T_x \\ -\frac{F_i}{m_i} & \frac{(F_x - F_i)}{m_i} & 0 \end{bmatrix} \cdot \begin{bmatrix} W_{itv} \\ W_{egr} \\ W_{vgt} \end{bmatrix}.$$

Defining an output vector y as:

$$y = \begin{bmatrix} p_i \\ p_x \\ F_i \end{bmatrix}$$

an input vector u as:

$$u = \begin{bmatrix} W_{itv} \\ W_{egr} \\ W_{vgt} \end{bmatrix}$$

a first vector Cf(x) of functions as:

$$Cf(x) = \begin{bmatrix} -\frac{\gamma R}{V_i} T_i W_{ei} \\ \frac{\gamma R}{V_x} T_{eout} W_{ex} \\ 0 \end{bmatrix}$$

and a matrix Gg(x) of functions as:

$$Gg(x) = \begin{bmatrix} \frac{\gamma R}{V_i} T_{ic} & \frac{\gamma R}{V_i} T_{egr} & 0 \\ 0 & -\frac{\gamma R}{V_x} T_x & -\frac{\gamma R}{V_x} T_x \\ -\frac{F_i}{m_i} & \frac{(F_x - F_i)}{m_i} & 0 \end{bmatrix}$$

the vector equation above may be rewritten as follows:

$$\dot{y} = Gg(x) \cdot u + Cf(x)$$

where x generically indicates a vector of state variables of the air charging system 195.

As a consequence, it is possible to define a vector v of virtual inputs:

$$v = \begin{bmatrix} v_1 \\ v_2 \\ v_3 \end{bmatrix}$$

and use this virtual input vector v to develop a feedback linearization control law u(x, v) according to the following vector equation:

$$u(x,v) = Gg(x)^{-1} \cdot (v - Cf(x))$$

such that:

$$\dot{y} = v$$

Figure 3:
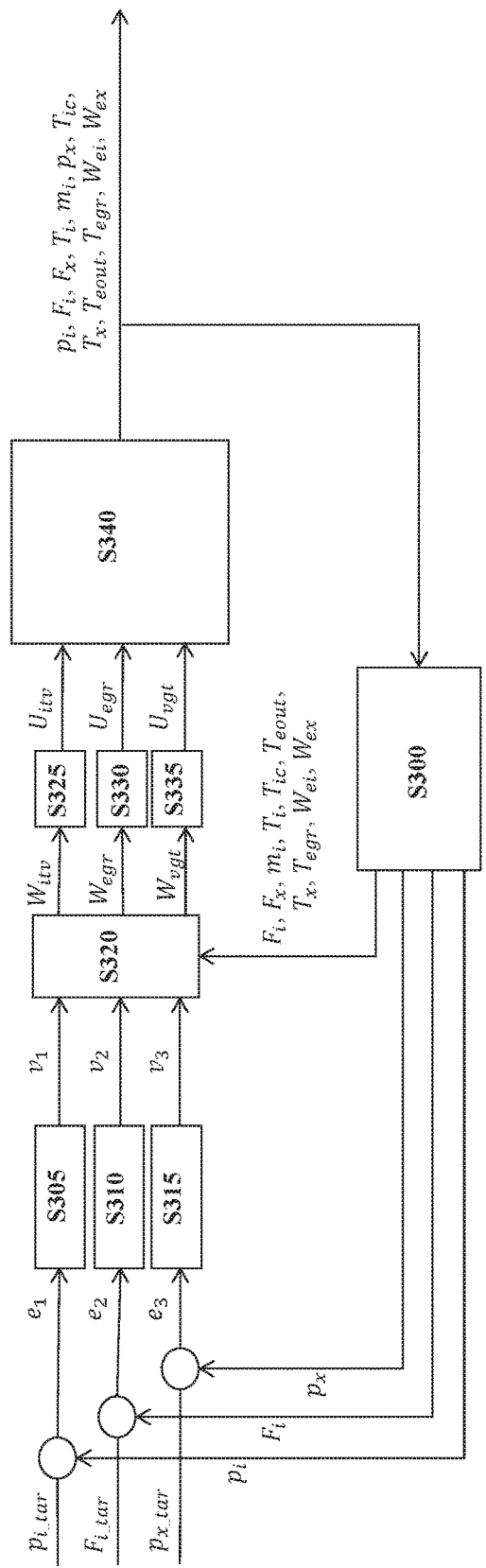
FIG. 3 is a flowchart representing in details a first example of a control strategy for an air charging system of the automotive system of FIG. 1.

As a matter of fact, the MIMO non-linear mathematical system has been transformed in an equivalent linear system, where each one of the virtual inputs $v_1$, $v_2$ and $v_3$ is related to only one of the output parameters $\dot{p}_i$, $\dot{p}_x$ and $\dot{F}_i$ and vice versa, and where the relation between each one of the virtual inputs and the respective output parameter is a linear relation. Taking advantage of this transformation, the ECU 450 may be configured to control the intake valve actuator 332, the EGR valve actuator 322 and the VGT actuator 290 during the operation of the ICE 110, by the linear control procedure illustrated in FIG. 3.

This control procedure provides for the ECU 450 to monitor (block S300) the value of the output parameters of the air charging system 195, namely the exhaust manifold pressure $p_x$, the intake manifold pressure $p_i$ and the residual gas fraction $F_i$ in the intake manifold 200, along with the value of the other observable state variables of the system involved in the MIMO non-linear mathematical model above, namely the intake manifold air temperature $T_i$, the air temperature $T_{ic}$ in the intake duct 205 downstream of the intercooler 260, the recirculated exhaust gas temperature $T_{egr}$, the exhaust manifold gas temperature $T_x$, the engine out exhaust gas temperature $T_{eout}$, the residual gas fraction $F_x$, in the exhaust manifold 225, the overall mass $m_i$ at the intake manifold 200, the overall mass flow rate $W_{ei}$ entering the engine 110 and the overall mass flow rate $W_{ex}$ exiting the engine 110.

In this regard, the value of the exhaust manifold pressure $p_x$ may be measured by a pressure sensor that may be disposed in the exhaust manifold 225 or in the exhaust pipe 275 upstream of the turbine 250. As an alternative, this pressure value may be estimated on the basis of other measurable operating parameters of the ICE 110, for example on the basis of the measurements made by the exhaust pressure and temperature sensors 430. The value of intake manifold pressure $p_i$ may be measured by the manifold pressure and temperature sensor 350 located in the intake manifold 200. The value of the residual gas fraction $F_i$ may be calculated as a function of the value of an oxygen concentration $O_2$ within the intake manifold 200, according to the equation $F_i = 1 - O_2$. The oxygen concentration value $O_2$ may be measured by a dedicated sensor disposed in the intake manifold 200 or may be estimated on the basis of other measurable operating parameters of the ICE 110. The value of the intake manifold air temperature $T_i$ may be measured by the manifold pressure and temperature sensor 350 located in the intake manifold 200. The value of the intake manifold air temperature downstream of the intercooler $T_{ic}$ may be measured by a dedicated sensor or estimated on the basis of the measurements made by the manifold pressure and temperature sensor 350.

The value of the recirculated exhaust gas temperature $T_{egr}$ may be measured by the HP-EGR temperature sensor 440. The value of the exhaust manifold gas temperature $T_x$ may be measured by a temperature sensor that may be disposed in the exhaust manifold 225 or in the exhaust pipe 275 upstream of the turbine 250. As an alternative, this temperature value may be estimated on the basis of other measurable operating parameters of the ICE 110, for example on the basis of the measurements made by the exhaust pressure and temperature sensors 430. The value of the engine out exhaust gas temperature $T_{eout}$ may be determined by a dedicated sensor or estimated on the basis of other measurable operating parameters of the ICE 110. The value of the residual gas fraction $F_x$ at the exhaust manifold 225 may be measured by a lambda sensor located in the exhaust pipe 275, upstream of the aftertreatment devices 280. The value of the overall mass $m_i$ at the intake manifold 200, the value of the overall mass flow rate $W_{ei}$ entering the engine 110 and the value of the overall mass flow rate $W_{ex}$ exiting the engine 110, may be measured or estimated with the aid of the mass airflow and temperature sensor 340.

The monitored values of the output parameters $p_i$, $F_i$ and $p_x$, are fed back and used to calculate an error (e.g. a difference) $e_1$, $e_2$ and $e_3$ between each one of them and a corresponding target value $p_{i\_tar}$, $F_{i\_tar}$ and $p_{x\_tar}$ thereof:

$$e_1 = p_{i\_tar} - p_i$$

$$e_2 = F_{i\_tar} - F_i$$

$$e_3 = p_{x\_tar} - p_x$$

The target values $p_{i\_tar}$, $p_{x\_tar}$ and $F_{i\_tar}$ for the output parameters may be determined by the ECU 450 on the basis of other conventional strategies, for example on the basis of the engine operating point.

The first error $e_1$ is then applied as input to a first single-input single-output (SISO) linear controller S305 that yields as output a corresponding value for the first virtual input $v_1$. The second error $e_2$ is applied as input to a second SISO linear controller S310 that yields as output a corresponding value for the second virtual input $v_2$. The third error $e_3$ is applied as input to a third SISO linear controller S315 that yields as output a corresponding value for the third virtual input $v_3$.

The three linear controller S305, S310 and S315 may be for example proportional-integrative (PI) controllers or proportional-integrative-differential (PID) controllers, and are tuned over the equivalent linear system explained above, such as to minimize the respective errors $e_1$, $e_2$ and $e_3$.

The values of the virtual inputs $v_1$, $v_2$ and $v_3$ are then applied to a non-linear calculation module S320, where they are used to calculate corresponding values of the input parameters $W_{itv}$, $W_{egr}$ and $W_{vgt}$ of the air charging system 195. In particular, the calculation module S320 may calculate the values of these input parameters with the feedback linearization control law that have been previously explained:

$$u = \begin{bmatrix} W_{itv} \\ W_{egr} \\ W_{vgt} \end{bmatrix} = Gg(x)^{-1} \cdot (v - Cf(x))$$

The calculated value of the air mass flow rate $W_{itv}$ is then applied to a calculation module S325, which may use a mathematical model of the intake valve 330 to yield as output a position $U_{itv}$ of the actuator 332, which corresponds to the calculated value of the air mass flow rate $W_{itv}$. The calculated value of the exhaust mass flow rate $W_{egr}$ is applied to another calculation module S330, which may use a mathematical model of the HP-EGR valve 320 to yield as output a position $U_{egr}$ of the actuator 322, which corresponds to the calculated value of the exhaust mass flow rate $W_{egr}$. The calculated value of the exhaust mass flow rate $W_{vgt}$ is applied to still another calculation module S335, which may use a mathematical model of the turbine 250 to yield as output a position $U_{vgt}$ of the actuator 290, which corresponds to the calculated value of the exhaust mass flow rate $W_{vgt}$.

The air intake valve actuator 332, the EGR valve actuator 322 and the VGT actuator 290 are finally operated according to the respective calculated position $U_{itv}$, $U_{egr}$ and $U_{vgt}$ (block S340). Should the EGR system include both the HP-EGR conduits 300 and the LP-EGR 500, the actuators of the air charging system 195 include the intake valve actuator 332, the HP-EGR valve actuator 322, the VGT actuator 290 and also the LP-EGR valve actuator 522.

According to this embodiment, the input parameters of the air charging system 195 may include a parameter $W_{itv}$ indicative of the air mass flow rate through the intake valve 330, a parameter $CdA_{egr\_HP}$ indicative of a flow effective area of the HP-EGR valve 320, a parameter $R_t$ indicative of a turbine power rate and a parameter $CdA_{egr\_LP}$ indicative of a flow effective area of the LP-EGR valve 520. The output parameters of the air charging system 195 may include a parameter $p_i$ indicative of an intake manifold pressure, a parameter $F_i$ indicative of a residual gas fraction in the intake manifold 200, a parameter $\beta_c$ indicative of a compression rate caused by the compressor 240 of the turbocharger 230, and a parameter $F_c$ indicative of a residual gas fraction in the intake duct 205 upstream of the compressor 240 of the turbocharger 230, particularly between the leading point of the LP-EGR conduit 500 and the compressor 240.

The MIMO non-linear mathematical model of the air charging system 195 may be defined by the following equations:

$$\dot{p}_i = \frac{dp_i}{dt} = \frac{RT_i}{V_i}\left(W_{itv} + \frac{p_x \xi_{egr\_HP}}{\sqrt{RT_x}}CdA_{egr\_HP} - \eta_{v0}\frac{V_d N_e}{120 RT_i}p_i\right)$$

$$\dot{\beta}_c = \frac{d\beta_c}{dt} = c \cdot (c_p \cdot (W_c + W_f) \cdot T_x \cdot R_t - c_p \cdot W_c \cdot T_{c\_us} \cdot R_c)$$

$$\dot{F}_i = \frac{dF_i}{dt} = \frac{RT_i}{p_i V_i}\left(\frac{p_x \xi_{egr\_HP}}{\sqrt{RT_x}}CdA_{egr\_HP}(F_x - F_i) + W_{itv}(F_c - F_i)\right)$$

$$\dot{F}_c = \frac{dF_c}{dt} = \frac{RT_{c\_us}}{p_{c\_us}V_{c\_us}}\left(\frac{p_x \xi_{egr\_LP}}{\sqrt{RT_{egr\_LP}}}CdA_{egr\_LP}(F_x - F_x) - W_a F_c\right)$$

Wherein:

R is the universal gas constant, $V_i$ is an intake manifold inner volume, $T_i$ is an air temperature within the intake manifold 200, $p_x$ is an exhaust gas pressure within the exhaust manifold 225, $\xi_{egr_{HP}}$ is an HP-EGR correction factor, $T_x$ is an exhaust gas temperature within the exhaust manifold 225, $\eta_{v0}$ is a volumetric efficiency of the engine, $V_d$ is a displacement of the engine, $N_e$ is an engine rotational speed, c is a constant related to the turbocharger inertia, $c_p$ is a specific heat capacity of a gas at constant pressure, $W_c$ is a mass flow rate of the air/gas flow through the compressor 240 of the turbocharger 230, $W_f$ is a mass flow rate of fuel injected into the combustion chambers 150 of the engine 110, $T_{c\_us}$ is a temperature of the air/gas flow in the intake duct 205 upstream of the compressor 240, $R_c$ is a compressor power rate, $F_x$ is a residual gas fraction within the exhaust manifold 225, $p_{c\_us}$ is a pressure of the air/gas flow in the intake duct 205 upstream of the compressor 240, $V_{c\_us}$ is a volume of the intake duct 205 upstream of the compressor 240, $\xi_{egr\_LP}$ is a LP-EGR correction factor, $p_{exh}$ is a pressure of the exhaust gas in the exhaust pipe 275 downstream of the aftertreatment devices 280, and $T_{egr\_LP}$ is a temperature of the exhaust gas in the LP-EGR conduit 500 and $W_a$ is an air mass flow rate in the intake duct 205.

The MIMO non-linear mathematical model of the air charging system 195 may be equally defined by the following vector equation:

$$\begin{bmatrix} \dot{p}_i \\ \dot{\beta}_c \\ \dot{F}_i \\ \dot{F}_c \end{bmatrix} = \begin{bmatrix} \frac{RT_i}{V_i}\left(W_{itv} + \frac{p_x\xi_{egr\_HP}}{\sqrt{RT_x}}CdA_{egr\_HP} - \eta_{v0}\frac{V_dN_e}{120RT_i}p_i\right) \\ c\cdot(c_p\cdot(W_c+W_f)\cdot T_x\cdot R_t - c_p\cdot W_c\cdot T_{c-us}\cdot R_c) \\ \frac{RT_i}{p_iV_i}\left(\frac{p_x\xi_{egr\_HP}}{\sqrt{RT_x}}CdA_{egr\_HP}(F_x-F_i) + W_{itv}(F_c-F_i)\right) \\ \frac{RT_{c\_us}}{p_{c\_us}V_{c\_us}}\left(\frac{p_{exh}\xi_{egr\_LP}}{\sqrt{RT_{egr\_LP}}}CdA_{egrLP}(F_x-F_c) - W_aF_c\right) \end{bmatrix} = \begin{bmatrix} \frac{RT_i}{V_i}\cdot\left(-\eta_{v0}\frac{V_dN_e}{120RT_i}p_i\right) \\ c\cdot(-c_p\cdot W_c\cdot T_{c\_us}\cdot R_c) \\ 0 \\ \frac{RT_{c\_us}}{p_{c\_us}V_{c\_us}}\cdot(-W_aF_c) \end{bmatrix} +$$

$$\begin{bmatrix} \frac{RT_i}{V_i} & \frac{RT_i}{V_i}\cdot\frac{p_x\xi_{egr\_HP}}{\sqrt{RT_x}} & 0 & 0 \\ 0 & 0 & 0 & c\cdot c_p\cdot(W_c+W_f)\cdot T_x \\ \frac{RT_i}{p_iV_i}\cdot(F_c-F_i) & \frac{RT_i}{p_iV_i}\cdot\frac{p_x\xi_{egr\_HP}}{\sqrt{RT_x}}\cdot(F_x-F_i) & 0 & 0 \\ 0 & 0 & \frac{RT_{c\_us}}{p_{c\_us}V_{c\_us}}\cdot\frac{p_{exh}\xi_{egr\_LP}}{\sqrt{RT_{egr\_LP}}}\cdot(F_x-F_c) & 0 \end{bmatrix} \cdot \begin{bmatrix} W_{itv} \\ CdA_{egr\_HP} \\ CdA_{egr\_LP} \\ R_t \end{bmatrix}.$$

Defining an output vector y as:

$$y = \begin{bmatrix} p_i \\ \beta_c \\ F_i \\ F_c \end{bmatrix}$$

an input vector u as:

$$u = \begin{bmatrix} W_{itv} \\ CdA_{egr\_HP} \\ CdA_{egr\_LP} \\ R_t \end{bmatrix}$$

a first vector f(x) of functions as:

$$f(x) = \begin{bmatrix} \frac{RT_i}{V_i}\cdot\left(-\eta_{v0}\frac{V_dN_e}{120RT_i}p_i\right) \\ c\cdot(-c_p\cdot W_c\cdot T_{c_{us}}\cdot R_c) \\ 0 \\ \frac{RT_{c\_us}}{p_{c\_us}V_{c\_us}}\cdot(-W_aF_c) \end{bmatrix}$$

and a matrix Gg(x) of functions as:

$$Gg(x) = \begin{bmatrix} \frac{RT_i}{V_i} & \frac{RT_i}{V_i}\cdot\frac{p_x\xi_{egr\_HP}}{\sqrt{RT_x}} & 0 & 0 \\ 0 & 0 & 0 & c\cdot c_p\cdot(W_c+W_f)\cdot T_x \\ \frac{RT_i}{p_iV_i}\cdot(F_c-F_i) & \frac{RT_i}{p_iV_i}\cdot\frac{p_x\xi_{egr\_HP}}{\sqrt{RT_x}}\cdot(F_x-F_i) & 0 & 0 \\ 0 & 0 & \frac{RT_{c\_us}}{p_{c\_us}V_{c\_us}}\cdot\frac{p_{exh}\xi_{egr\_LP}}{\sqrt{RT_{egr\_LP}}}\cdot(F_x-F_c) & 0 \end{bmatrix}$$

The vector equation above may be written, also in this case, in the general form $$\dot{y} = f(x) + Gg(x)\cdot u$$

where x generically indicates a vector of state variables of the air charging system 195.

As a consequence, it is still possible to define a vector v of virtual inputs:

$$v = \begin{bmatrix} v_1 \\ v_2 \\ v_3 \\ v_4 \end{bmatrix}$$

and use this virtual input vector v to develop a feedback linearization control law u(x,v) according to the following vector equation:

$$u(x,v) = Gg(x)^{-1} \cdot (v - f(x))$$

such that:

$$\dot{y} = v$$

Hence, also in this case the MIMO non-linear mathematical system has been transformed in an equivalent linear system, where each one of the virtual inputs $v_1$, $v_2$, $v_3$ and $v_4$ is related to only one of the output parameters $\dot{p}_i$, $\dot{\beta}_c$, $\dot{F}_i$ and $\dot{F}_c$ and vice versa, and where the relation between each one of the virtual inputs and the respective output parameter is a linear relation.

Figure 4:
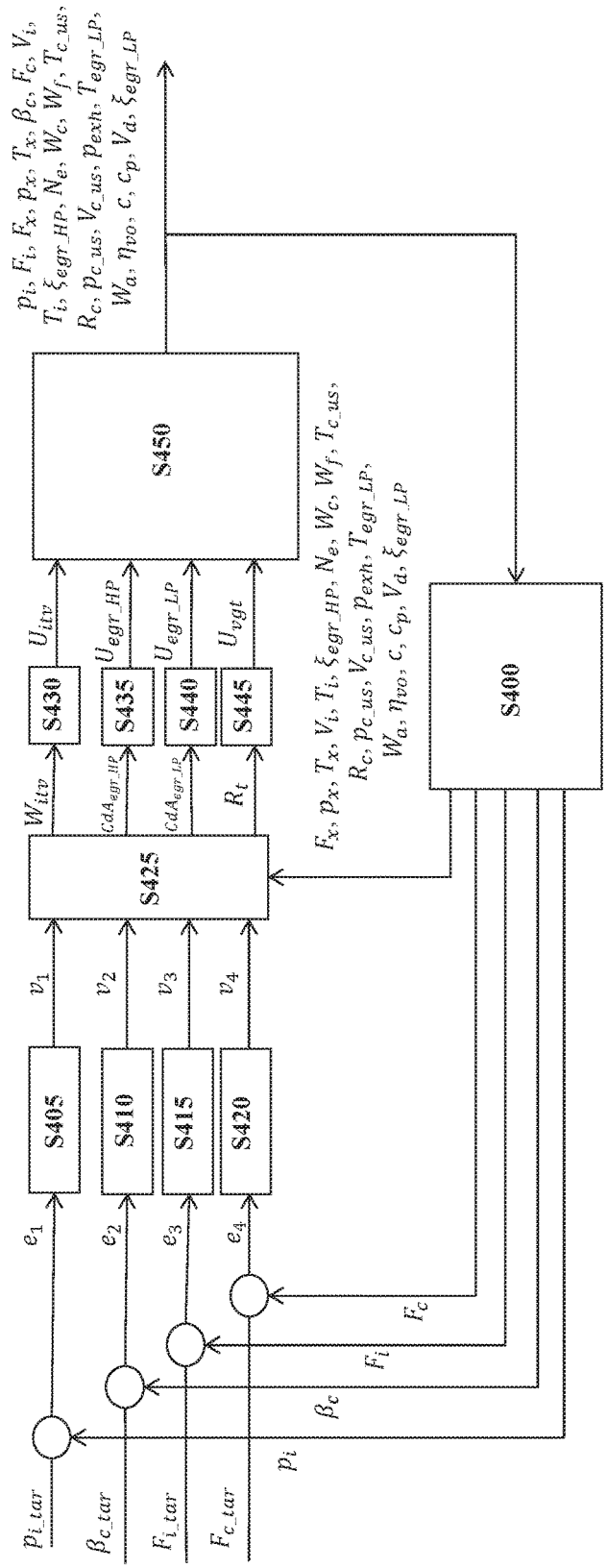
FIG. 4 is a flowchart representing in details a second example of a control strategy for an air charging system of the automotive system of FIG. 1.

Taking advantage of this transformation, the ECU 450 may be configured to control the intake valve actuator 332, the HP-EGR valve actuator 322, the VGT actuator 290 and the LP-EGR valve actuator 522 during the operation of the 110, by the linear control procedure as illustrated in FIG. 4.

This control procedure provides for the ECU 450 to monitor (block S400) the value of the output parameters of the air charging system 195, namely the compression rate $\beta_c$, the intake manifold pressure $p_i$, the residual gas fraction $F_i$ in the intake manifold 200 and the residual gas fraction $F_c$, along with the value of the other observable state variables of the system and constants involved in the MIMO non-linear mathematical model above, namely the intake manifold inner volume $V_i$, the air temperature $T_i$ within the intake manifold 200, the exhaust gas pressure $p_x$ in the exhaust manifold, the HP-EGR correction coefficient $\xi_{egr\_HP}$, the exhaust gas temperature $T_x$ within the exhaust manifold 225, the volumetric efficiency $\eta_{v0}$ of the engine, the displacement $V_d$ of the engine, the engine speed $N_e$, the constant c, the specific heat capacity $c_p$ of a gas at constant pressure, the mass flow rate $W_c$ of the air/gas flow through the compressor 240 of the turbocharger 230, the mass flow rate $W_f$ of fuel injected into the combustion chambers 150 of the engine 110, the temperature $T_{c\_us}$ of the air/gas flow in the intake duct 205 upstream of the compressor 240, the compressor power rate $R_c$, the residual gas fraction $F_x$ within the exhaust manifold 225, the pressure $p_{c\_us}$ of the air/gas flow in the intake duct 205 upstream of the compressor 240, the volume $V_{c\_us}$ of the intake duct 205 upstream of the compressor 240, the LP-EGR correction coefficient $\xi_{egr\_LP}$, the pressure $p_{exh}$ of the exhaust gas in the exhaust pipe 275 downstream of the aftertreatment devices 280, the temperature $T_{egr\_LP}$ of the exhaust gas in the LP-EGR conduit 500 and the air mass flow rate $W_a$ in the intake duct 205.

In this regard, the value of the compression rate $\beta_c$ may be determined as the ratio between the pressure in the duct upstream the throttle 331 and compressor upstream pressure $p_{c\_us}$. The value of intake manifold pressure $p_i$ may be measured by the manifold pressure and temperature sensor 350 located in the intake manifold 200. The value of the intake manifold inner volume $V_i$ is a constant that depends on the geometry of the air charging system. The value of the residual gas fraction $F_i$ may be calculated as a function of the value of an oxygen concentration $O_2$ within the intake manifold 200, according to the equation $F_i = 1 - O_2$. The oxygen concentration value $O_2$ may be measured by a dedicated sensor disposed in the intake manifold 200 or may be estimated on the basis of other measurable operating parameters of the ICE 110. The value of the residual gas fraction $F_c$ may be determined as a function of the value of an oxygen concentration $O_{2c}$ at the intake duct 205 upstream the compressor 240, according to the equation $F_c = 1 - O_{2c}$. The compressor oxygen concentration $O_{2c}$ may be estimated on the basis of other measureable operating parameters in the intake duct 205 and in the LP pipe 500. The value of the intake manifold air temperature $T_i$ may be measured (downstream of the intercooler 260) by the manifold pressure and temperature sensor 350 located in the intake manifold 200.

The value of the exhaust manifold pressure $p_x$ may be measured by a pressure sensor that may be disposed in the exhaust manifold 225 or in the exhaust pipe 275 upstream of the turbine 250. As an alternative, this pressure value may be estimated on the basis of other measurable operating parameters of the ICE 110, for example on the basis of the measurements made by the exhaust pressure and temperature sensors 430. The value of the HP-EGR correction coefficient $\xi_{egr\_HP}$ is a nonlinear function of the pressure ratio across the HP-EGR valve. The value of the exhaust manifold gas temperature $T_x$ may be measured by a temperature sensor that may be disposed in the exhaust manifold 225 or in the exhaust pipe 275 upstream of the turbine 250. As an alternative, this temperature value may be estimated on the basis of other measurable operating parameters of the ICE 110, for example on the basis of the measurements made by the exhaust pressure and temperature sensors 430. The value of the volumetric efficiency $\eta_{v0}$ of the engine is a constant that depends on the geometry of the engine. The value of the displacement $V_d$ of the engine is a constant that depends on the geometry of the engine. The value of the engine speed $N_e$ may be measured by the crank position sensor 420. The value of c is a constant. The value of the specific heat capacity $c_p$ is a constant. The value of the mass flow rate $W_c$ of the air/gas flow through the compressor 240 of the turbocharger 230 may be determined as the sum of the air mass flow rate $W_a$ and the mass flow rate through the LP EGR. The value of the mass flow rate $W_f$ of fuel injected into the combustion chambers 150 of the engine 110 may be provided by the control strategies that operate the fuel injectors 160. The value of the temperature $T_{c\_us}$ of the air/gas flow in the intake duct 205 upstream of the compressor 240 may be determined on the basis of other measurable operating parameters in the intake duct 205 and in the LP pipe 500. The value of the compressor power rate $R_c$ may be determined as a function of the mass flow rate $W_c$ of the air/gas flow through the compressor 240 of the compression rate $\beta_c$, of the pressure $p_{c\_us}$, of the the temperature $T_{c\_us}$ and of the universal gas constant R. The value of the residual gas fraction $F_x$ at the exhaust manifold 225 may be measured by a lambda sensor located in the exhaust pipe 275, upstream of the aftertreatment devices 280. The value of the pressure $p_{c\_us}$ of the air/gas flow in the intake duct 205 upstream of the compressor 240 may be estimated on the basis of other measurable operating parameters in the intake duct 205 and on the LP pipe 500. The value of the volume $V_{c\_us}$ of intake duct upstream of the compressor 240 is a constant that depends on the geometry of the air charging system. The value of the LP-EGR correction coefficient $\xi_{egr\_LP}$ is a nonlinear function of the pressure ratio across the LP-EGR valve. The pressure $p_{exh}$ of the exhaust gas in the exhaust pipe 275 downstream of the aftertreatment devices 280 may be determined on the basis of other measurable operating parameters in the exhaust pipe 275. The value of the temperature $T_{egr\_LP}$ of the exhaust gas in the LP-EGR conduit 500 may be measured by a dedicated sensor located in the duct upstream the LP EGR valve 521. The value of the air mass flow rate $W_a$ in the intake duct 205 may be calculated by the sensor 340.

The monitored values of the output parameters $\beta_c$, $p_i$, $F_i$ and $F_c$ are fed back and used to calculate an error (i.e. a difference) $e_1$, $e_2$, $e_3$ and $e_4$ between each one of them and a corresponding target value $p_{i\_tar}$, $F_{i\_tar}$ and $p_{x\_tar}$ thereof:

$$e_1 = p_{i\_tar} - p_i$$

$$e_2 = \beta_{c\_tar} - \beta_c$$

$$e_3 = F_{i\_tar} - F_i$$

$$e_4 = F_{c\_tar} - F_c$$

The target values $p_{i\_tar}$, $\beta_{c\_tar}$, $F_{i\_tar}$ and $F_{c\_tar}$ for the output parameters may be determined by the ECU 450 on the basis of other conventional strategies, for example on the basis of the engine operating point.

The first error $e_1$ is then applied as input to a first single-input single-output (SISO) linear controller S405 that yields as output a corresponding value for the first virtual input $v_1$. The second error $e_2$ is applied as input to a second SISO linear controller S410 that yields as output a corresponding value for the second virtual input $v_2$. The third error $e_3$ is applied as input to a third SISO linear controller S415 that yields as output a corresponding value for the third virtual input $v_3$. The fourth error $e_4$ is applied as input to a fourth SISO linear controller S420 that yields as output a corresponding value for the third virtual input $v_4$.

The four linear controllers S405, S410, S415 and S420 may be for example proportional-integrative (PI) controllers or proportional-integrative-differential (RID) controllers, and are tuned over the equivalent linear system explained above, such as to minimize the respective errors $e_1$, $e_2$, $e_3$ and $e_4$.

The values of the virtual inputs $v_1$, $v_2$, $v_3$ and $v_4$ are then applied to a non-linear calculation module S425, where they are used to calculate corresponding values of the input parameters $W_{itv}$, $CdA_{egr\_HP}$, $CdA_{egr\_LP}$ and $R_t$ of the air charging system 195. In particular, the calculation module S425 may calculate these input parameters with the feedback linearization control law that have been previously explained:

$$u = \begin{bmatrix} W_{itv} \\ CdA_{egr\_HP} \\ CdA_{egr\_LP} \\ R_t \end{bmatrix} = Gg(x)^{-1} \cdot (v - f(x))$$

The calculated value of the air mass flow rate $W_{itv}$ is then applied to a calculation module S430, which may use a mathematical model of the intake valve 330 to yield as output a position $U_{itv}$ of the actuator 332, which corresponds to the calculated value of the air mass flow rate $W_{itv}$. The calculated value of the flow effective area $CdA_{egr\_HP}$ is applied to another calculation module S435, which may use a mathematical model of the HP-EGR valve 320 to yield as output a position $U_{egr\_HP}$ of the actuator 322, which corresponds to the calculated value of the flow effective area $CdA_{egr\_HP}$. The calculated value of the flow effective area $CdA_{egr\_LP}$ is applied to still another calculation module S440, which may use a mathematical model of the LP-EGR valve 520 to yield as output a position $U_{egr\_LP}$ of the actuator 522, which corresponds to the calculated value of the flow effective area $CdA_{egr\_LP}$. The calculated value of the turbine power rate $R_t$ is applied to still another calculation module S445 of the turbine 250 to yield as output a position $U_{vgt}$ of the actuator 290, which corresponds to the calculated value of the turbine power rate $R_t$.

The air intake valve actuator 332, the HP-EGR valve actuator 322, the LP-EGR valve actuator 522 and the VGT actuator 290 are finally operated according to the respective calculated position $U_{itv}$, $U_{egr\_HP}$, $U_{egr\_LP}$ and $U_{vgt}$ (block S450).

Under the hypothesis that the EGR system includes both the HP-EGR conduits 300 and the LP-EGR 500, a second embodiment of the solution may prescribe that the input parameters of the air charging system 195 include a parameter $W_{itv}$ indicative of the air mass flow rate through the intake valve 330, a parameter $CdA_{egr\_HP}$ indicative of a flow effective area of the HP-EGR valve 320, a parameter $CdA_{vgt}$ indicative of a flow effective area of the turbine (240) and a parameter $CdA_{egr\_LP}$ indicative of a flow effective area of the LP-EGR valve 520. The output parameters of the air charging system 195 may include a parameter $p_i$ indicative of an intake manifold pressure, a parameter $F_i$ indicative of a residual gas fraction in the intake manifold 200, a parameter $p_{itv\_us}$ indicative of a pressure within the air intake duct 205 between the compressor 240 and the intake valve 330, particularly between the intake valve 330 and the intercooler 260, and a parameter $F_c$ indicative of a residual gas fraction in the intake duct 205 upstream of the compressor 240 of the turbocharger 230, particularly between the leading point of the LP-EGR conduit 500 and the compressor 240.

The MIMO non-linear mathematical model of the air charging system 195 may be defined b the following equations:

$$\dot{p}_i = \frac{dp_i}{dt} = \frac{RT_i}{V_i}\left(W_{itv} + \frac{p_x \xi_{egr\_HP}}{\sqrt{RT_x}} CdA_{egr\_HP} - \eta_{v0} \frac{V_d N_e}{120 RT_i} p_i\right)$$

$$\dot{p}_{itv\_us} = \frac{dp_{itv\_us}}{dt} = \frac{RT_{itv\_us}}{V_{itv\_us}}\left(-W_{itv} + \frac{p_x \xi_{vgt}}{\sqrt{RT_x}} CdA_{vgt} - W_f\right)$$

$$\dot{F}_i = \frac{dF_i}{dt} = \frac{RT_i}{p_i V_i}\left(\frac{p_x \xi_{egr\_HP}}{\sqrt{RT_x}} CdA_{egr\_HP}(F_x - F_i) + W_{itv}(F_c - F_i)\right)$$

$$\dot{F}_c = \frac{dF_c}{dt} = \frac{RT_{c\_us}}{p_{c\_us} V_{c\_us}}\left(\frac{p_{exh} \xi_{egr\_LP}}{\sqrt{RT_{egr\_LP}}} CdA_{egr\_LP}(F_x - F_c) - W_a F_c\right)$$

Wherein:
R is the universal gas constant,
$V_i$ is an intake manifold inner volume,
$T_i$ is an air temperature within the intake manifold 200,
$p_x$ is an exhaust manifold pressure,
$\xi_{egr_{HP}}$ is an HP-EGR correction factor,
$T_x$ is an exhaust gas temperature within the exhaust manifold 225,
$\eta_{v0}$ is a volumetric efficiency of the engine,
$V_d$ is a displacement of the engine,
$N_e$ is an engine rotational speed,
$T_{itv_{us}}$ is an air temperature between the compressor 240 and the intake valve 330, particularly between the intake valve 330 and the intercooler 260,
$V_{itv\_us}$ is a volume of the duct between the compressor 240 and the intake valve 330,
$\xi_{vgt}$ is a turbine correction factor,
$W_f$ is a mass flow rate of fuel injected into the combustion chambers 150 of the engine 110,
$T_{c\_us}$ is a temperature of the air/gas flow in the intake duct 205 upstream of the compressor 240,
$F_x$ is a residual gas fraction within the exhaust manifold 225,
$p_{c\_us}$ is a pressure of the air/gas flow in the intake duct 205 upstream of the compressor 240,
$V_{c\_us}$ is a volume of the intake duct 205 upstream of the compressor 240,
$\xi_{egr\_LP}$ is a LP-EGR correction factor,
$p_{exh}$ is a pressure of the exhaust gas in the exhaust pipe 275 downstream of the aftertreatment devices 280,
$T_{egr\_LP}$ is a temperature of the exhaust gas in the LP-EGR conduit 500, and
$W_a$ is an air mass flow rate in the intake duct 205.

The MIMO non-linear mathematical model of the air charging system 195 may be equally defined by the following vector equation:

$$\begin{bmatrix} \dot{p}_i \\ \dot{p}_{itv\_us} \\ \dot{F}_i \\ \dot{F}_c \end{bmatrix} = \begin{bmatrix} \frac{RT_i}{V_i}\left(W_{itv} + \frac{p_x\xi_{egr\_HP}}{\sqrt{RT_x}}CdA_{egr\_HP} - \eta_{v0}\frac{V_dN_e}{120RT_i}p_i\right) \\ \frac{RT_{itv\_us}}{V_{itv\_us}}\left(-W_{itv} + \frac{p_x\xi_{vgt}}{\sqrt{RT_x}}CdA_{vgt} - W_f\right) \\ \frac{RT_i}{p_iV_i}\left(\frac{p_x\xi_{egr\_HP}}{\sqrt{RT_x}}CdA_{egr\_HP}(F_x - F_i) + W_{itv}(F_c - F_i)\right) \\ \frac{RT_{c\_us}}{p_{c\_us}V_{c\_us}}\left(\frac{p_{exh}\xi_{egr\_LP}}{\sqrt{RT_{egr\_LP}}}CdA_{egr\_LP}(F_x - F_c) - W_aF_c\right) \end{bmatrix} = \begin{bmatrix} \frac{RT_i}{V_i}\cdot\left(-\eta_{v0}\frac{V_dN_e}{120RT_i}p_i\right) \\ -\frac{RT_{itv\_us}}{V_{itv\_us}}\cdot W_f \\ 0 \\ \frac{RT_{c\_us}}{p_{c\_us}V_{c\_us}}\cdot(-W_aF_c) \end{bmatrix} +$$

$$\begin{bmatrix} \frac{RT_i}{V_i} & \frac{RT_i}{V_i}\cdot\frac{p_x\xi_{egr\_HP}}{\sqrt{RT_x}} & 0 & 0 \\ -\frac{RT_{itv\_us}}{V_{itv\_us}} & 0 & 0 & \frac{RT_{itv\_us}}{V_{itv\_us}}\cdot\frac{p_x\xi_{vgt}}{\sqrt{RT_x}} \\ \frac{RT_i}{p_iV_i}\cdot(F_c - F_i) & \frac{RT_i}{p_iV_i}\cdot\frac{p_x\xi_{egr\_HP}}{\sqrt{RT_x}}\cdot(F_x - F_i) & 0 & 0 \\ 0 & 0 & \frac{RT_{c\_us}}{p_{c\_us}V_{c\_us}}\cdot\frac{p_{exh}\xi_{egr\_LP}}{\sqrt{RT_{egr\_LP}}}\cdot(F_x - F_c) & 0 \end{bmatrix}\cdot$$

$$\begin{bmatrix} W_{itv} \\ CdA_{egr\_HP} \\ CdA_{egr\_LP} \\ CdA_{vgt} \end{bmatrix}.$$

Defining an output vector y as:

$$y = \begin{bmatrix} p_i \\ p_{itv\_us} \\ F_i \\ F_c \end{bmatrix}$$

an input vector u as:

$$u = \begin{bmatrix} W_{itv} \\ CdA_{egr\_HP} \\ CdA_{egr\_LP} \\ CdA_{vgt} \end{bmatrix}$$

a first vector f(x) of functions as:

$$f(x) = \begin{bmatrix} \frac{RT_i}{V_i}\cdot\left(-\eta_{v0}\frac{V_dN_e}{120RT_i}p_i\right) \\ -\frac{RT_{itv\_us}}{V_{itv\_us}}\cdot\frac{p_x\xi_{vgt}}{\sqrt{RT_x}} \\ 0 \\ \frac{RT_{c\_us}}{p_{c\_us}V_{c\_us}}\cdot(-W_aF_c) \end{bmatrix}$$

and a matrix Gg(x) of functions as:

$$Gg(x) = \begin{bmatrix} \frac{RT_i}{V_i} & \frac{RT_i}{V_i}\cdot\frac{p_x\xi_{egr\_HP}}{\sqrt{RT_x}} & 0 & 0 \\ -\frac{RT_{itv\_us}}{V_{itv\_us}} & 0 & 0 & \frac{RT_{itv\_us}}{V_{itv\_us}}\cdot\frac{p_x\xi_{vgt}}{\sqrt{RT_x}} \\ \frac{RT_i}{p_iV_i}\cdot(F_c - F_i) & \frac{RT_i}{p_iV_i}\cdot\frac{p_x\xi_{egr\_HP}}{\sqrt{RT_x}}\cdot(F_x - F_i) & 0 & 0 \\ 0 & 0 & \frac{RT_{c\_us}}{p_{c\_us}V_{c\_us}}\cdot\frac{p_{exh}\xi_{egr\_LP}}{\sqrt{RT_{egr\_LP}}}\cdot(F_x - F_c) & 0 \end{bmatrix}$$

The vector equation above may be written, also in this case, in the general form:

$$\dot{y}=f(x)+Gg(x)\cdot u$$

where x generically indicates a vector of state variables of the air charging system 195.

As a consequence, it is still possible to define a vector v of virtual inputs:

$$v = \begin{bmatrix} v_1 \\ v_2 \\ v_3 \\ v_4 \end{bmatrix}$$

and use this virtual input vector v to develop a feedback linearization control law u(x, v) according to the following vector equation:

$$u(x,v)=Gg(x)^{-1}\cdot(v-f(x))$$

such that:

$$\dot{y}=v$$

Hence, also in this case the MIMO non-linear mathematical system has been transformed in an equivalent linear system, where each one of the virtual inputs $v_1$, $v_2$, $v_3$ and $v_4$ is related to only one of the output parameters $\dot{p}_i$, $\dot{p}_{itv\_us}$, $\dot{F}_i$ and $\dot{F}_c$ and vice versa, and where the relation between each one of the virtual inputs and the respective output parameter is a linear relation.

Figure 5:
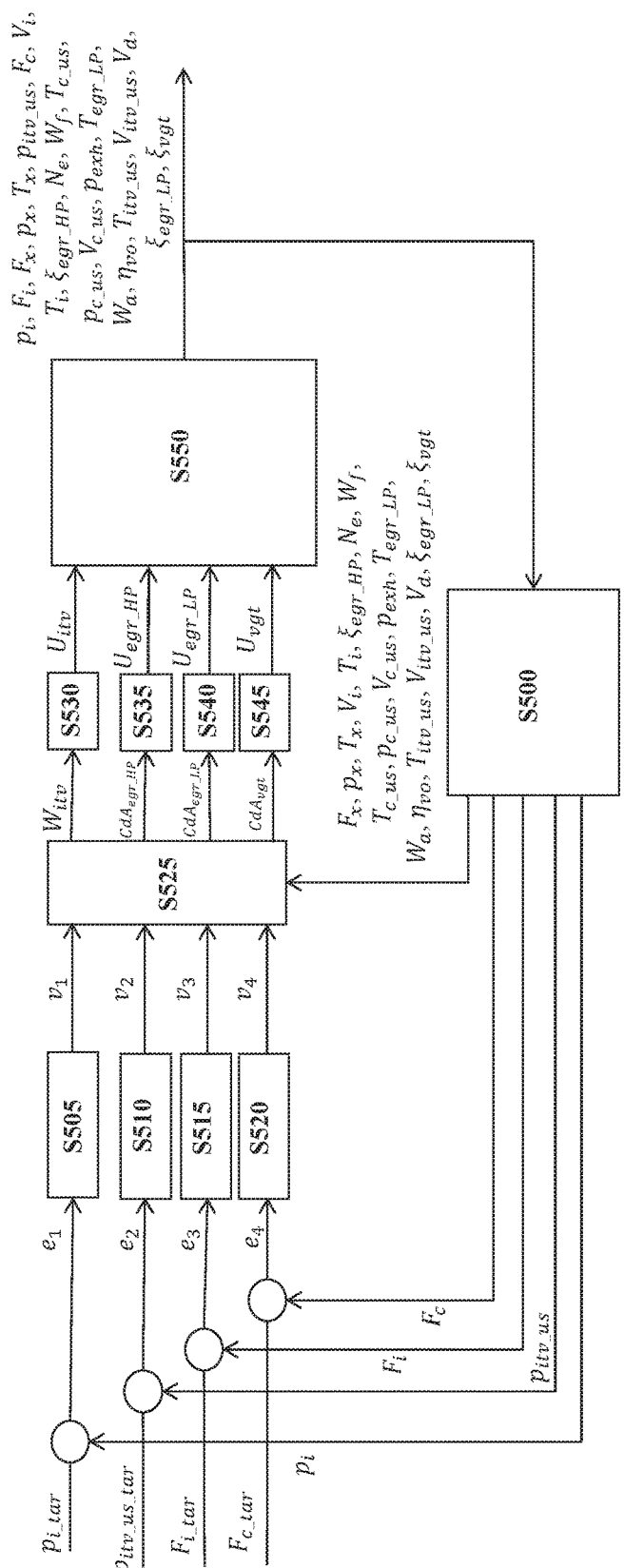
FIG. 5 is a flowchart representing in details a third example of a control strategy for an air charging system of the automotive system of FIG. 1.

Taking advantage of this transformation, the ECU 450 may be configured to control the intake valve actuator 332, the HP-EGR valve actuator 322, the VGT actuator 290 and the LP-EGR valve actuator 522 during the operation of the ICE 110, by the linear control procedure as illustrated in FIG. 5.

This control procedure provides for the ECU 450 to monitor (block S500) the value of the output parameters of the air charging system 195, namely the pressure $p_{itv\_us}$ between the intake valve 330 and the compressor 240, the intake manifold pressure $p_i$, the residual gas fraction $F_i$ in the intake manifold 200 and the residual gas fraction $F_c$, along with the value of the other observable state variables of the system and constants involved in the MIMO non-linear mathematical model above, namely the intake manifold inner volume $V_i$, the air temperature $T_i$ within the intake manifold 200, the exhaust manifold pressure $p_x$, the HP-EGR correction coefficient $\xi_{egr\_HP}$, the exhaust gas temperature $T_x$ within the exhaust manifold 225, the volumetric efficiency $\eta_{v0}$ of the engine, the displacement $V_d$ of the engine, the engine speed $N_e$, the air temperature $T_{itv\_us}$ between the compressor 240 and the intake valve 330, particularly between the intake valve 330 and the intercooler 260, the volume $V_{itv\_us}$ between the compressor 240 and the intake valve 330, the turbine correction factor $\xi_{vgt}$, the mass flow rate $W_f$ of fuel injected into the combustion chambers 150 of the engine 110, the temperature $T_{c\_us}$ of the air/gas flow in the intake duct 205 upstream of the compressor 240, the residual gas fraction $F_x$ within the exhaust manifold 225, the pressure $p_{c\_us}$ of the air/gas flow in the intake duct 205 upstream of the compressor 240, the volume $V_{c\_us}$ of the intake duct 205 upstream of the compressor 240, the LP-EGR correction coefficient $\xi_{egr\_LP}$, the pressure $p_{exh}$ of the exhaust gas in the exhaust pipe 275 downstream of the aftertreatment devices 280, the temperature $T_{egr\_LP}$ of the exhaust gas in the LP-EGR conduit 500 and the air mass flow rate $W_a$ in the intake duct 205.

In this regard, the value of the pressure $p_{itv\_us}$ between the intake valve 330 and the compressor 240 may be measured with a dedicated sensor or estimated using a model. The value of intake manifold pressure $p_i$ may be measured by the manifold pressure and temperature sensor 350 located in the intake manifold 200. The value of the intake manifold inner volume $V_i$ is a constant that depends on the geometry of the air charging system. The value of the residual gas fraction $F_i$ may be calculated as a function of the value of an oxygen concentration $O_2$ within the intake manifold 200, according to the equation $F_i=1-O_2$. The oxygen concentration value $O_2$ may be measured by a dedicated sensor disposed in the intake manifold 200 or may be estimated on the basis of other measurable operating parameters of the ICE 110. The value of the residual gas fraction $F_c$ may be determined as a function of the value of an oxygen concentration $O_{2c}$ at the intake duct 205 upstream the compressor 240, according to the equation $F_c=1-O_{2c}$. The compressor oxygen concentration $O_{2c}$ may be estimated on the basis of other measurable operating parameters in the intake duct 205 and in the LP pipe 500. The value of the intake manifold air temperature $T_i$ may be measured (downstream of the intercooler 260) by the manifold pressure and temperature sensor 350 located in the intake manifold 200. The value of the exhaust manifold pressure $p_x$ may be measured by a pressure sensor that may be disposed in the exhaust manifold 225 or in the exhaust pipe 275 upstream of the turbine 250. As an alternative, this pressure value may be estimated on the basis of other measurable operating parameters of the ICE 110, for example on the basis of the measurements made by the exhaust pressure and temperature sensors 430. The value of the HP-EGR correction coefficient $\xi_{egr\_HP}$ is a nonlinear function of the pressure ratio across the HP-EGR valve. The value of the exhaust manifold gas temperature $T_x$ may be measured by a temperature sensor that may be disposed in the exhaust manifold 225 or in the exhaust pipe 275 upstream of the turbine 250.

As an alternative, this temperature value may be estimated on the basis of other measurable operating parameters of the ICE 110, for example on the basis of the measurements made by the exhaust pressure and temperature sensors 430. The value of the volumetric efficiency $\eta_{v0}$ of the engine is a constant that depends on the geometry of the engine. The value of the displacement $V_d$ of the engine is a constant that depends on the geometry of the engine. The value of the engine speed $N_e$ may be measured by the crank position sensor 420. The value of the air temperature $T_{itv\_us}$ may be determined with a dedicated sensor or estimated using a model. The value of the volume between the compressor 240 and the intake valve 330 $V_{itv\_us}$ is a constant that depends on the geometry of the air charging system. The value of the turbine correction factor $\xi_{vgt}$ is a nonlinear function of the pressure ratio across the VGT.

The value of the mass flow rate $W_f$ of fuel injected into the combustion chambers 150 of the engine 110 may be provided by the control strategies that operate the fuel injectors 160. The value of the temperature $T_{c\_us}$ of the air/gas flow in the intake duct 205 upstream of the compressor 240 may be determined on the basis of other measurable operating parameters in the intake duct 205 and in the LP pipe 500. The value of the residual gas fraction $F_x$ at the exhaust manifold 225 may be measured by a lambda sensor located in the exhaust pipe 275, upstream of the aftertreatment devices 280. The value of the pressure $p_{c\_us}$ of the air/gas flow in the intake duct 205 upstream of the compressor 240 may be estimated on the basis of other measurable operating parameters in the intake duct 205 and on the LP pipe 500. The value of the volume $V_{c\_us}$ of intake duct upstream of the compressor 240 is a constant that depends on the geometry of the air charging system. The value of the LP-EGR correction coefficient $\xi_{egr\_LP}$ is a nonlinear function of the pressure ratio across the LP-EGR valve. The pressure $p_{exh}$ of the exhaust gas in the exhaust pipe 275 downstream of the aftertreatment devices 280 may be determined on the basis of other measurable operating parameters in the exhaust pipe 275. The value of the temperature $T_{egr\_LP}$ of the exhaust gas in the LP-EGR conduit 500 may be measured by a dedicated sensor located in the duct upstream the LP EGR valve 521. The value of the air mass flow rate $W_a$ in the intake duct 205 may be calculated by the sensor 340.

The monitored values of the output parameters $p_{itv\_us}$, $p_i$, $F_i$ are $F_c$ fed back and used to calculate an error (i.e. a difference) $e_1$, $e_2$, $e_3$ and $e_4$ between each one of them and a corresponding target value $p_{i\_tar}$, $F_{i\_tar}$ and $p_{x\_tar}$ thereof:

$$e_1 = p_{i\_tar} - p_i$$

$$e_2 = p_{itv\_us\_tar} - p_{itv\_us}$$

$$e_3 = F_{i\_tar} - F_i$$

$$e_4 = F_{c\_tar} - F_c$$

The target values $p_{i\_tar}$, $p_{itv\_us\_tar}$, $F_{i\_tar}$ and $F_{c\_tar}$ for the output parameters may be determined by the ECU 450 on the basis of other conventional strategies, for example on the basis of the engine operating point. The first error $e_1$ is then applied as input to a first single-input single-output (SISO) linear controller S505 that yields as output a corresponding value for the first virtual input $v_1$. The second error $e_2$ is applied as input to a second SISO linear controller S510 that yields as output a corresponding value for the second virtual input $v_2$. The third error $e_3$ is applied as input to a third SISO linear controller S515 that yields as output a corresponding value for the third virtual input $v_3$. The fourth error $e_4$ is applied as input to a fourth SISO linear controller S520 that yields as output a corresponding value for the third virtual input $v_4$.

The four linear controllers S505, S510, S515 and S520 may be for example proportional-integrative (PI) controllers or proportional-integrative-differential (PID) controllers, and are tuned over the equivalent linear system explained above, such as to minimize the respective errors $e_1$, $e_2$, $e_3$ and $e_4$.

The values of the virtual inputs $v_1$, $v_2$, $v_3$ and $v_4$ are then applied to a non-linear calculation module S525, where they are used to calculate corresponding values of the input parameters $W_{itv}$, $CdA_{egr\_HP}$, $CdA_{egr\_LP}$ and $CdA_{vgt}$ of the air charging system 195. In particular, the calculation module S525 may calculate these input parameters with the feedback linearization control law that have been previously explained:

$$u = \begin{bmatrix} W_{itv} \\ CdA_{egr\_HP} \\ CdA_{egr\_LP} \\ CdA_{vgt} \end{bmatrix} = Gg(x)^{-1} \cdot (v - f(x))$$

The calculated value of the air mass flow rate $W_{itv}$ is then applied to a calculation module S530, which may use a mathematical model of the intake valve 330 to yield as output a position $U_{itv}$ of the actuator 332, which corresponds to the calculated value of the air mass flow rate $W_{itv}$. The calculated value of the flow effective area $CdA_{egr\_HP}$ is applied to another calculation module S535, which may use a mathematical model of the HP-EGR valve 320 to yield as output a position $U_{egr\_HP}$ of the actuator 322, which corresponds to the calculated value of the flow effective area $CdA_{egr\_HP}$. The calculated value of the flow effective area $CdA_{egr\_LP}$ is applied to still another calculation module S540, which may use a mathematical model of the LP-EGR valve 520 to yield as output a position $U_{egr\_LP}$ of the actuator 522, which corresponds to the calculated value of the flow effective area $CdA_{egr\_LP}$. The calculated value of the flow effective area $CdA_{vgt}$ of the turbine is applied to still another calculation module S545 of the turbine 250 to yield as output a position $U_{vgt}$ of the actuator 290, which corresponds to the calculated value of the flow effective area $CdA_{vgt}$ of the turbine. The air intake valve actuator 332, the HP-EGR valve actuator 322, the LP-EGR valve actuator 522 and the VGT actuator 290 are finally operated according to the respective calculated position $U_{itv}$, $U_{egr\_HP}$, $U_{egr\_LP}$ and $U_{vgt}$ (block S550).

Under the hypothesis that the EGR system includes both the HP-EGR conduits 300 and the LP-EGR 500, a third embodiment of the solution may prescribe that the input parameters of the air charging system 195 include a parameter $W_{itv}$ indicative of the air mass flow rate through the intake valve 330, a parameter $CdA_{egr\_HP}$ indicative of a flow effective area of the HP-EGR valve 320, a parameter $CdA_{vgt}$ indicative of a flow effective area of the turbine and a parameter $CdA_{egr\_LP}$ indicative of a flow effective area of the LP-EGR valve 520. The output parameters of the air charging system 195 may include a parameter $p_i$ indicative of an intake manifold pressure, a parameter $F_i$ indicative of a residual gas fraction in the intake manifold 200, a parameter $p_x$ indicative of an exhaust gas pressure within the exhaust manifold 225, and a parameter $F_c$ indicative of a residual gas fraction in the intake duct 205 upstream of the compressor 240 of the turbocharger 230, particularly between the leading point of the LP-EGR conduit 500 and the compressor 240.

The MIMO non-linear mathematical model of the air charging system 195 may be defined by the following equations:

$$\dot{p}_i = \frac{dp_i}{dt} = \frac{RT_i}{V_i}\left(W_{itv} + \frac{p_x \xi_{egr\_HP}}{\sqrt{RT_x}} CdA_{egr\_HP} - \eta_{v0} \frac{V_d N_e}{120 RT_i} p_i\right)$$

$$\dot{p}_x = \frac{dp_x}{dt} =$$
$$\frac{RT_x}{V_x}\left(\eta_{v0} \frac{V_d N_e}{120 RT_i} p_i - W_f - \frac{p_x \xi_{egr\_HP}}{\sqrt{RT_x}} CdA_{egr\_HP} - \frac{p_x \xi_{vgt}}{\sqrt{RT_x}} CdA_{vgt}\right)$$

$$\dot{F}_i = \frac{dF_i}{dt} = \frac{RT_i}{p_i V_i}\left(\frac{p_x \xi_{egr\_HP}}{\sqrt{RT_x}} CdA_{egr\_HP}(F_x - F_i) + W_{itv}(F_c - F_i)\right)$$

$$\dot{F}_c = \frac{dF_c}{dt} = \frac{RT_{c\_us}}{p_{c\_us} V_{c\_us}}\left(\frac{p_{exh} \xi_{egr\_LP}}{\sqrt{RT_{egr\_LP}}} CdA_{egr\_LP}(F_x - F_c) - W_a F_c\right)$$

Wherein:
R is the universal gas constant,
$V_i$ is an intake manifold inner volume,
$T_i$ is an air temperature within the intake manifold 200,
$\xi_{egr_{HP}}$ is an HP-EGR correction factor, $T_x$ is an exhaust gas temperature within the exhaust manifold 225,
$\eta_{v0}$ is a volumetric efficiency of the engine,
$V_d$ is a displacement of the engine,
$N_e$ is an engine rotational speed,
$V_x$ is an exhaust manifold volume,
$\xi_{vgt}$ is a turbine correction factor,
$W_f$ is a mass flow rate of fuel injected into the combustion chambers 150 of the engine 110,
$T_{c\_us}$ is a temperature of the air/gas flow in the intake duct 205 upstream of the compressor 240,
$F_x$ is a residual gas fraction within the exhaust manifold 225,
$p_{c\_us}$ is a pressure of the air/gas flow in the intake duct 205 upstream of the compressor 240,
$V_{c\_us}$ is a volume of the intake duct 205 upstream of the compressor 240,
$\xi_{egr\_LP}$ is a LP-EGR correction factor, $p_{exh}$ is a pressure of the exhaust gas in the exhaust pipe 275 downstream of the aftertreatment devices 280,
$T_{egr\_LP}$ is a temperature of the exhaust gas in the LP-EGR conduit 500, and
$W_a$ is an air mass flow rate in the intake duct 205.

The MIMO non-linear mathematical model of the air charging system 195 may be equally defined by the following vector equation:

$$\begin{bmatrix} \dot{p}_i \\ \dot{p}_x \\ \dot{F}_i \\ \dot{F}_c \end{bmatrix} = \begin{bmatrix} \dfrac{RT_i}{V_i}\left(W_{itv} + \dfrac{p_x \xi_{egr\_HP}}{\sqrt{RT_x}} CdA_{egr\_HP} - \eta_{v0}\dfrac{V_d N_e}{120\,RT_i} p_i\right) \\ \dfrac{RT_x}{V_x}\left(\eta_{v0}\dfrac{N_d V_e}{120 RT_i} p_i - W_f - \dfrac{p_x \xi_{egr\_HP}}{\sqrt{RT_x}} CdA_{egr\_HP} - \dfrac{p_x \xi_{vgt}}{\sqrt{RT_x}} CdA_{vgt}\right) \\ \dfrac{RT_i}{p_i V_i}\left(\dfrac{p_x \xi_{egr\_HP}}{\sqrt{RT_x}} CdA_{egr\_HP}(F_x - F_i) + W_{itv}(F_c - F_i)\right) \\ \dfrac{RT_{c\_us}}{p_{c\_us} V_{c\_us}}\left(\dfrac{p_{exh}\xi_{egr\_LP}}{\sqrt{RT_{egr\_LP}}} CdA_{egr_{LP}}(F_x - F_c) - W_a F_c\right) \end{bmatrix} =$$

$$\begin{bmatrix} \dfrac{RT_i}{V_i}\cdot\left(-\eta_{v0}\dfrac{V_d N_e}{120\,RT_i} p_i\right) \\ \dfrac{RT_x}{V_x}\left(\eta_{v0}\dfrac{V_d N_e}{120\,RT_i} p_i + W_f\right) \\ 0 \\ \dfrac{RT_{c\_us}}{p_{c\_us} V_{c\_us}}\cdot(-W_a F_c) \end{bmatrix} +$$

$$\begin{bmatrix} \dfrac{RT_i}{V_i} & \dfrac{RT_i}{V_i}\cdot\dfrac{p_x \xi_{egr\_HP}}{\sqrt{RT_x}} & 0 & 0 \\ 0 & -\dfrac{RT_x}{V_x}\cdot\dfrac{p_x \xi_{egr\_HP}}{\sqrt{RT_x}} & 0 & -\dfrac{RT_x}{V_x}\cdot\dfrac{p_x \xi_{vgt}}{\sqrt{RT_x}} \\ \dfrac{RT_i}{p_i V_i}\cdot(F_c - F_i) & \dfrac{RT_x}{p_i V_i}\cdot\dfrac{p_x \xi_{egr\_HP}}{\sqrt{RT_x}}\cdot(F_x - F_i) & 0 & 0 \\ 0 & 0 & \dfrac{RT_{c\_us}}{p_{c\_us} V_{c\_us}}\cdot\dfrac{p_x \xi_{egr\_LP}}{\sqrt{RT_{egr\_LP}}}\cdot(F_x - F_i) & 0 \end{bmatrix} \cdot \begin{bmatrix} W_{itv} \\ CdA_{egr\_HP} \\ CdA_{egr\_LP} \\ CdA_{vgt} \end{bmatrix}.$$

Defining an output vector y as:

$$y = \begin{bmatrix} p_i \\ p_x \\ F_i \\ F_c \end{bmatrix}$$

an input vector u as:

$$u = \begin{bmatrix} W_{itv} \\ CdA_{egr\_HP} \\ CdA_{egr\_LP} \\ CdA_{vgt} \end{bmatrix}$$

a first vector f(x) of functions as:

$$f(x) = \begin{bmatrix} \frac{RT_i}{V_i} \cdot \left(-\eta_{v0} \frac{V_d N_e}{120 RT_i} p_i\right) \\ \frac{RT_x}{V_x} \left(\eta_{v0} \frac{V_d N_e}{120 RT_i} p_i + W_f\right) \\ 0 \\ \frac{RT_{c\_us}}{p_{c\_us} V_{c\_us}} \cdot (-W_a F_c) \end{bmatrix}$$

and a matrix Gg(x) of functions as:

$$Gg(x) = \begin{bmatrix} \frac{RT_i}{V_i} & \frac{RT_i}{V_i} \cdot \frac{p_x \xi_{egr\_HP}}{\sqrt{RT_x}} & 0 & 0 \\ 0 & -\frac{RT_x}{V_x} \cdot \frac{p_x \xi_{egr\_HP}}{\sqrt{RT_x}} & 0 & -\frac{RT_x}{V_x} \cdot \frac{p_x \xi_{vgt}}{\sqrt{RT_x}} \\ \frac{RT_i}{p_i V_i} \cdot (F_c - F_i) & \frac{RT_x}{p_i V_i} \cdot \frac{p_x \xi_{egr\_HP}}{\sqrt{RT_x}} \cdot (F_x - F_i) & 0 & 0 \\ 0 & 0 & \frac{RT_{c\_us}}{p_{c\_us} V_{c\_us}} \cdot \frac{p_x \xi_{egr\_LP}}{\sqrt{RT_{egr\_LP}}} \cdot (F_x - F_i) & 0 \end{bmatrix}$$

The vector equation above may be written, also in this case, in the general form:

$$\dot{y} = f(x) + Gg(x) \cdot u$$

where x generically indicates a vector of state variables of the air charging system 195.

As a consequence, it is still possible to define a vector v of virtual inputs:

$$v = \begin{bmatrix} v_1 \\ v_2 \\ v_3 \\ v_4 \end{bmatrix}$$

and use this virtual input vector v to develop a feedback linearization control law u(x,v) according to the following vector equation:

$$u(x,v) = Gg(x)^{-1} \cdot (v - f(x))$$

such that:

$$\dot{y} = v$$

Hence, also in this case the MIMO non-linear mathematical system has been transformed in an equivalent linear system, where each one of the virtual inputs $v_1$, $v_2$, $v_3$ and $v_4$ is related to only one of the output parameters $\dot{p}_i$, $\dot{p}_x$, $\dot{F}_i$ and $\dot{F}_c$ and vice versa, and where the relation between each one of the virtual inputs and the respective output parameter is a linear relation.

Figure 6:
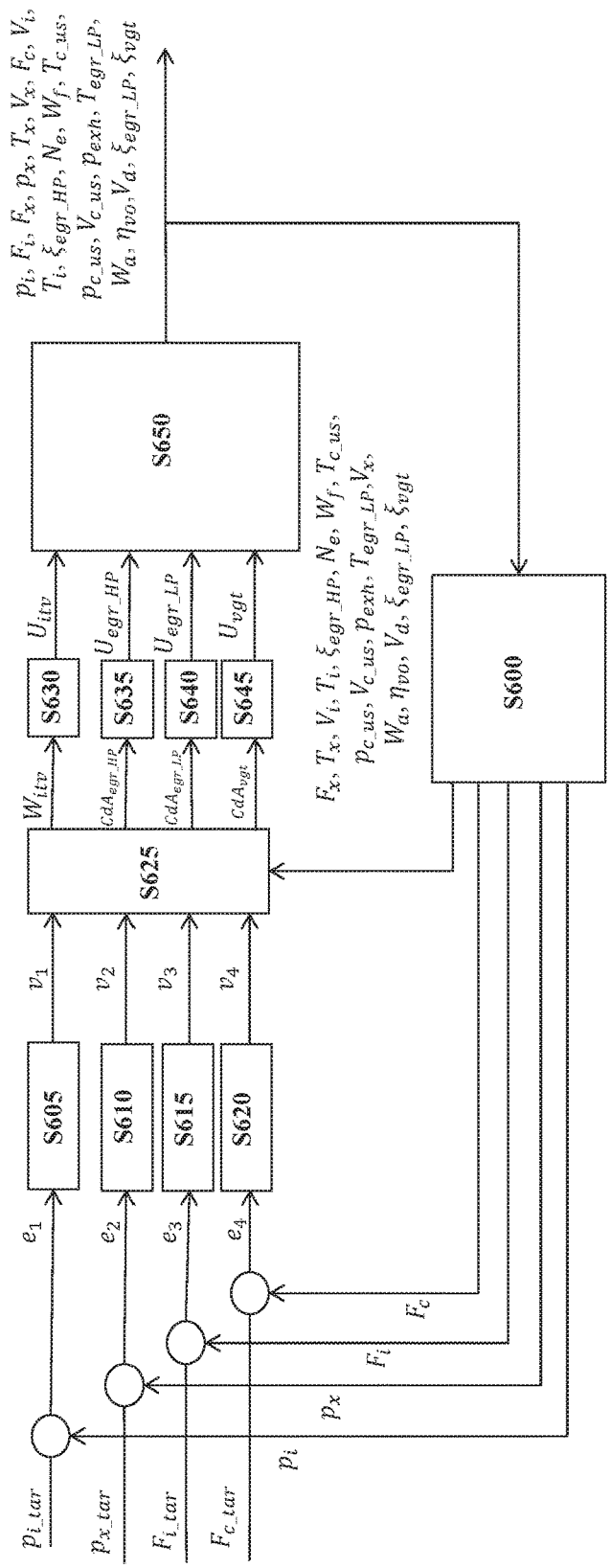
FIG. 6 is a flowchart representing in details a fourth example of a control strategy for an air charging system of the automotive system of FIG. 1.

Taking advantage of this transformation, the ECU 450 may be configured to control the intake valve actuator 332, the HP-EGR valve actuator 322, the VGT actuator 290 and the LP-EGR valve actuator 522 during the operation of the ICE 110 by the linear control procedure as illustrated in FIG. 6.

This control procedure provides for the ECU 450 to monitor (block S600) the value of the output parameters of the air charging system 195, namely the exhaust manifold pressure $p_x$, the intake manifold pressure $p_i$, the residual gas fraction $F_i$ in the intake manifold 200 and the residual gas fraction $F_c$, along with the value of the other observable state variables of the system and constants involved in the MIMO non-linear mathematical model above, namely the intake manifold inner volume $V_i$, the air temperature $T_i$ within the intake manifold 200, the RP-EGR correction coefficient $\xi_{egr\_HP}$, the exhaust gas temperature $T_x$ within the exhaust manifold 225, the volumetric efficiency $\eta_{v0}$ of the engine, the displacement $V_d$ of the engine, the engine speed $N_e$, the exhaust manifold volume $V_x$, the turbine correction factor $\xi_{vgt}$, the mass flow rate $W_f$ of fuel injected into the combustion chambers 150 of the engine 110, the temperature $T_{c\_us}$ of the air/gas flow in the intake duct 205 upstream of the compressor 240, the residual gas fraction $F_x$ within the exhaust manifold 225, the pressure $p_{c\_us}$ of the air/gas flow in the intake duct 205 upstream of the compressor 240, the volume $V_{c\_us}$ of the intake duct 205 upstream of the compressor 240, the LP-EGR correction coefficient $\xi_{egr\_LP}$, the pressure $p_{exh}$ of the exhaust gas in the exhaust pipe 275 downstream of the aftertreatment devices 280, the temperature $T_{egr\_LP}$ of the exhaust gas in the LP-EGR conduit 500 and the air mass flow rate $W_a$ in the intake duct 205.

In this regard, the value of the exhaust manifold pressure $p_x$ may be measured by a pressure sensor that may be disposed in the exhaust manifold 225 or in the exhaust pipe 275 upstream of the turbine 250. As an alternative, this pressure value may be estimated on the basis of other measurable operating parameters of the ICE 110, for example on the basis of the measurements made by the exhaust pressure and temperature sensors 430. The value of intake manifold pressure $p_i$ may be measured by the manifold pressure and temperature sensor 350 located in the intake manifold 200. The value of the intake manifold inner volume $V_i$ is a constant that depends on the geometry of the air charging system. The value of the residual gas fraction $F_i$ may be calculated as a function of the value of an oxygen concentration $O_2$ within the intake manifold 200, according to the equation $F_i=1-O_2$. The oxygen concentration value $O_2$ may be measured by a dedicated sensor disposed in the intake manifold 200 or may be estimated on the basis of other measurable operating parameters of the ICE 110. The value of the residual gas fraction $F_c$ may be determined as a function of the value of an oxygen concentration $O_{2c}$ at the intake duct 205 upstream the compressor 240, according to the equation $F_c=1-O_{2c}$. The compressor oxygen concentration $O_2$ may be estimated on the basis of other measurable operating parameters in the intake duct 205 and in the LP pipe 500. The value of the intake manifold air temperature $T_i$ may be measured (downstream of the intercooler 260) by the manifold pressure and temperature sensor 350 located in the intake manifold 200. The value of the HP-EGR correction coefficient $\xi_{egr\_HP}$ is a nonlinear function of the pressure ratio across the HP-EGR valve. The value of the exhaust manifold gas temperature $T_x$ may be measured by a temperature sensor that may be disposed in the exhaust manifold 225 or in the exhaust pipe 275 upstream of the turbine 250. As an alternative, this temperature value may be estimated on the basis of other measurable operating parameters of the ICE 110, for example on the basis of the measurements made by the exhaust pressure and temperature sensors 430. The value of the volumetric efficiency $\eta_{v0}$ of the engine is a constant that depends on the geometry of the engine. The value of the displacement $V_d$ of the engine is a constant that depends on the geometry of the engine. The value of the engine speed $N_e$ may be measured by the crank position sensor 420. The volume $V_x$ of the exhaust manifold is a constant that depends on the geometry of that component. The value of the turbine correction factor $\xi_{vgt}$ is a nonlinear function of the pressure ratio across the VGT.

The value of the mass flow rate $W_f$ of fuel injected into the combustion chambers 150 of the engine 110 may be provided by the control strategies that operate the fuel injectors 160. The value of the temperature $T_{c\_us}$ of the air/gas flow in the intake duct 205 upstream of the compressor 240 may be determined on the basis of other measurable operating parameters in the intake duct 205 and in the LP pipe 500. The value of the residual gas fraction $F_x$ at the exhaust manifold 225 may be measured by a lambda sensor located in the exhaust pipe 275, upstream of the aftertreatment devices 280. The value of the pressure $p_{c\_us}$ of the air/gas flow in the intake duct 205 upstream of the compressor 240 may be estimated on the basis of other measurable operating parameters in the intake duct 205 and on the LP pipe 500. The value of the volume $V_{c\_us}$ of intake duct upstream of the compressor 240 is a constant that depends on the geometry of the air charging system. The value of the LP-EGR correction coefficient $\xi_{egr\_LP}$ is a nonlinear function of the pressure ratio across the LP-EGR valve. The pressure $p_{exh}$ of the exhaust gas in the exhaust pipe 275 downstream of the aftertreatment devices 280 may be determined on the basis of other measurable operating parameters in the exhaust pipe 275. The value of the temperature $T_{egr\_LP}$ of the exhaust gas in the LP-EGR conduit 500 may be measured by a dedicated sensor located in the duct upstream the LP EGR valve 521. The value of the air mass flow rate $W_a$ in the intake duct 205 may be calculated by the sensor 340.

The monitored values of the output parameters $p_x$, $p_i$, $F_i$ and $F_c$ are fed back and used to calculate an error (i.e. a difference) $e_1$, $e_2$, $e_3$ and $e_4$ between each one of them and a corresponding target value $p_{i\_tar}$, $F_{i\_tar}$ and $p_{x\_tar}$ thereof:

$$e_1 = p_{i\_tar} - p_i$$

$$e_2 = p_{x\_tar} - p_x$$

$$e_3 = F_{i\_tar} - F_i$$

$$e_4 = F_{c\_tar} - F_c$$

The target values to $p_{i\_tar}$, $p_{x\_tar}$, $F_{i\_tar}$ and $F_{c\_tar}$ for the output parameters may be determined by the ECU 450 on the basis of other conventional strategies, for example on the basis of the engine operating point.

The first error $e_1$ is then applied as input to a first single-input single-output (SISO) linear controller S605 that yields as output a corresponding value for the first virtual input $v_1$. The second error $e_2$ is applied as input to a second SISO linear controller S610 that yields as output a corresponding value for the second virtual input $v_2$. The third error $e_3$ is applied as input to a third SISO linear controller S615 that yields as output a corresponding value for the third virtual input $v_3$. The fourth error $e_4$ is applied as input to a fourth SISO linear controller S620 that yields as output a corresponding value for the third virtual input $v_4$.

The four linear controllers S605, S610, S615 and S620 may be for example proportional-integrative (PI) controllers or proportional-integrative-differential (PID) controllers, and are tuned over the equivalent linear system explained above, such as to minimize the respective errors $e_1$, $e_2$, $e_3$ and $e_4$.

The values of the virtual inputs $v_1$, $v_2$, $v_3$ and $v_4$ are then applied to a non-linear calculation module S625, where they are used to calculate corresponding values of the input parameters $W_{itv}$, $CdA_{egr\_HP}$, $CdA_{egr\_LP}$ and $CdA_{vgt}$ of the air charging system 195. In particular, the calculation module S625 may calculate these input parameters with the feedback linearization control law that have been previously explained:

$$u = \begin{bmatrix} W_{itv} \\ CdA_{egr\_HP} \\ CdA_{egr\_LP} \\ CdA_{vgt} \end{bmatrix} = Gg(x)^{-1} \cdot (v - f(x))$$

The calculated value of the air mass flow rate $W_{itv}$ is then applied to a calculation module S630, which may use a mathematical model of the intake valve 330 to yield as output a position $U_{itv}$ of the actuator 332, which corresponds to the calculated value of the air mass flow rate $W_{itv}$. The calculated value of the flow effective area $CdA_{egr\_HP}$ is applied to another calculation module S635, which may use a mathematical model of the HP-EGR valve 320 to yield as output a position $U_{egr\_HP}$ of the actuator 322, which corresponds to the calculated value of the flow effective area $CdA_{egr\_HP}$. The calculated value of the flow effective area $CdA_{egr\_LP}$ is applied to still another calculation module S640, which may use a mathematical model of the LP-EGR valve 520 to yield as output a position $U_{egr\_LP}$ of the actuator 522, which corresponds to the calculated value of the flow effective area $CdA_{egr\_LP}$. The calculated value of the flow effective area $CdA_{vgt}$ of the turbine is applied to still another calculation module S645 of the turbine 250 to yield as output a position $U_{vgt}$ of the actuator 290, which corresponds to the calculated value of the flow effective area $CdA_{vgt}$ of the turbine.

The air intake valve actuator 332, the HP-EGR valve actuator 322, the LP-EGR valve actuator 522 and the VGT actuator 290 are finally operated according to the respective calculated position $U_{itv}$, $U_{egr\_HP}$, $U_{egr\_LP}$ and $U_{vgt}$ (block S650).

Under the hypothesis that the EGR system includes both the HP-EGR conduits 300 and the LP-EGR 500, a fourth embodiment of the solution may prescribe that the input parameters of the air charging system 195 include a parameter $W_{itv}$ indicative of the air mass flow rate through the intake valve 330, a parameter $CdA_{egr\_HP}$ indicative of a flow effective area of the HP-EGR valve 320, a parameter $CdA_{vgt}$ indicative of a flow effective area of the turbine and a parameter $CdA_{egr\_LP}$ indicative of a flow effective area of the LP-EGR valve 520. The output parameters of the air charging system 195 may include a parameter $p_{itv\_us}$ indicative of a pressure within the air intake duct 205 between the compressor 240 and the intake valve 330, particularly between the intake valve 330 and the intercooler 260, a parameter $F_i$ indicative of a residual gas fraction in the intake manifold 200, a parameter $p_x$ indicative of an exhaust manifold pressure, and a parameter $F_c$ indicative of a residual gas fraction in the intake duct 205 upstream of the compressor 240 of the turbocharger 230, particularly between the leading point of the LP-EGR conduit 500 and the compressor 240.

The MIMO non-linear mathematical model of the air charging system 195 may be defined by the following equations:

$$\dot{p}_{itv\_us} = \frac{dp_{itv\_us}}{dt} = \frac{RT_{itv\_us}}{V_{itv\_us}}\left(-W_{itv} + \frac{p_x \xi_{vgt}}{\sqrt{RT_x}} CdA_{vgt} - W_f\right)$$

$$\dot{p}_x = \frac{dp_x}{dt} =$$
$$\frac{RT_x}{V_x}\left(\eta_{v0}\frac{V_d N_e}{120 RT_i} p_i - W_f - \frac{p_x \xi_{egr\_HP}}{\sqrt{RT_x}} CdA_{egr\_HP} - \frac{p_x \xi_{vgt}}{\sqrt{RT_x}} CdA_{vgt}\right)$$

$$\dot{F}_i = \frac{dF_i}{dt} = \frac{RT_i}{p_i V_i}\left(\frac{p_x \xi_{egr\_HP}}{\sqrt{RT_x}} CdA_{egr\_HP}(F_x - F_i) + W_{itv}(F_c - F_i)\right)$$

-continued $$\dot{F}_c = \frac{dF_c}{dt} = \frac{RT_{c\_us}}{p_{c\_us}V_{c\_us}}\left(\frac{p_{exh}\xi_{egr\_LP}}{\sqrt{RT_{egr\_LP}}} CdA_{egr\_LP}(F_x - F_c) - W_a F_c\right)$$

Wherein:
R is the universal gas constant,
$p_i$ is an intake manifold pressure,
$V_i$ is an intake manifold inner volume,
$T_i$ is an air temperature within the intake manifold 200,
$\xi_{egr_{HP}}$ is an HP-EGR correction factor,
$T_x$ is an exhaust gas temperature within the exhaust manifold
$\eta_{v0}$ is a volumetric efficiency of the engine,
$V_d$ is a displacement of the engine,
$N_e$ is an engine rotational speed,
$T_{itv\_us}$ is an air temperature between the compressor 240 and the intake valve 330, particularly between the intake valve 330 and the intercooler 260,
$V_{itv\_us}$ is the volume between the intake valve 330 and the compressor 240,
$\xi_{vgt}$ is a turbine correction factor,
$V_x$ is an exhaust manifold volume,
$W_f$ is a mass flow rate of fuel injected into the combustion chambers 150 of the engine 110,
$T_{c\_us}$ is a temperature of the air/gas flow in the intake duct 205 upstream of the compressor 240,
$F_x$ is a residual gas fraction within the exhaust manifold 225,
$p_{c\_us}$ is a pressure of the air/gas flow in the intake duct 205 upstream of the compressor 240,
$V_{c\_us}$ is a volume of the intake duct 205 upstream of the compressor 240,
$\xi_{egr\_LP}$ is a LP-EGR correction factor, $p_{exh}$ is a pressure of the exhaust gas in the exhaust pipe 275 downstream of the aftertreatment devices 280,
$T_{egr\_LP}$ is a temperature of the exhaust gas in the LP-EGR conduit 500, and
$W_a$ is an air mass flow rate in the intake duct 205.

The MIMO non-linear mathematical model of the air charging system 195 may be equally defined by the following vector equation:

$$\begin{bmatrix} \dot{p}_i \\ \dot{p}_x \\ \dot{F}_i \\ \dot{F}_c \end{bmatrix} = \begin{bmatrix} \frac{RT_i}{V_i}\left(-W_{itv} + \frac{p_x \xi_{egr\_HP}}{\sqrt{RT_x}} CdA_{egr\_HP} - W_f\right) \\ \frac{RT_x}{V_x}\left(\eta_{v0}\frac{N_d V_e}{120RT_i} p_i - W_f - \frac{p_x \xi_{egr\_HP}}{\sqrt{RT_x}} CdA_{egr\_HP} - \frac{p_x \xi_{vgt}}{\sqrt{RT_x}} CdA_{vgt}\right) \\ \frac{RT_i}{p_i V_i}\left(\frac{p_x \xi_{egr\_HP}}{\sqrt{RT_x}} CdA_{egr\_HP}(F_x - F_i) + W_{itv}(F_c - F_i)\right) \\ \frac{RT_{c\_us}}{p_{c\_us}V_{c\_us}}\left(\frac{p_{exh}\xi_{egr\_LP}}{\sqrt{RT_{egr\_LP}}} CdA_{egr_{LP}}(F_x - F_c) - W_a F_c\right) \end{bmatrix} =$$

$$\begin{bmatrix} -\frac{RT_{itv\_us}}{V_{itv\_us}} \cdot W_f \\ \frac{RT_x}{V_x}\left(\eta_{v0}\frac{V_d N_e}{120 RT_i} p_i + W_f\right) \\ 0 \\ \frac{RT_{c\_us}}{p_{c\_us}V_{c\_us}} \cdot (-W_a F_c) \end{bmatrix} +$$

$$\begin{bmatrix} -\dfrac{RT_{itv\_us}}{V_{itv\_us}} & 0 & 0 & 0 \\ 0 & -\dfrac{RT_x}{V_x} \cdot \dfrac{p_x \xi_{egr\_HP}}{\sqrt{RT_x}} & 0 & \dfrac{RT_{itv\_us}}{V_{itv\_us}} \cdot \dfrac{p_x \xi_{vgt}}{\sqrt{RT_x}} \\ \dfrac{RT_i}{p_i V_i} \cdot (F_c - F_i) & \dfrac{RT_i}{p_i V_i} \cdot \dfrac{p_x \xi_{egr\_HP}}{\sqrt{RT_x}} \cdot (F_x - F_i) & 0 & 0 \\ 0 & 0 & \dfrac{RT_{c\_us}}{p_{c\_us} V_{c\_us}} \cdot \dfrac{p_x \xi_{egr\_LP}}{\sqrt{RT_{egr\_LP}}} \cdot (F_x - F_i) & 0 \end{bmatrix} \cdot \begin{bmatrix} W_{itv} \\ CdA_{egr\_HP} \\ CdA_{egr\_LP} \\ CdA_{vgt} \end{bmatrix}$$

Defining an output vector y as:

$$y = \begin{bmatrix} p_{itv\_us} \\ p_x \\ F_i \\ F_c \end{bmatrix}$$

an input vector u as:

$$u = \begin{bmatrix} W_{itv} \\ CdA_{egr\_HP} \\ CdA_{egr\_LP} \\ CdA_{vgt} \end{bmatrix}$$

a first vector f(x) of functions as:

$$f(x) = \begin{bmatrix} -\dfrac{RT_{itv\_us}}{V_{itv\_us}} \cdot W_f \\ \dfrac{RT_x}{V_x} \left( \eta_{v0} \dfrac{V_d N_e}{120 RT_i} p_i + W_f \right) \\ 0 \\ \dfrac{RT_{c\_us}}{p_{c\_us} V_{c\_us}} \cdot (-W_a F_c) \end{bmatrix}$$

and a matrix Gg(x) of functions as:

$$Gg(x) = \begin{bmatrix} -\dfrac{RT_{itv\_us}}{V_{itv\_us}} & 0 & 0 & 0 \\ 0 & -\dfrac{RT_x}{V_x} \cdot \dfrac{p_x \xi_{egr\_HP}}{\sqrt{RT_x}} & 0 & \dfrac{RT_{itv\_us}}{V_{itv\_us}} \cdot \dfrac{p_x \xi_{vgt}}{\sqrt{RT_x}} \\ \dfrac{RT_i}{p_i V_i} \cdot (F_c - F_i) & \dfrac{RT_i}{p_i V_i} \cdot \dfrac{p_x \xi_{egr\_HP}}{\sqrt{RT_x}} \cdot (F_x - F_i) & 0 & 0 \\ 0 & 0 & \dfrac{RT_{c\_us}}{p_{c\_us} V_{c\_us}} \cdot \dfrac{p_x \xi_{egr\_LP}}{\sqrt{RT_{egr\_LP}}} \cdot (F_x - F_i) & 0 \end{bmatrix}$$

The vector equation above may be written, also in this case, in the general form:

$$\dot{y} = f(x) + Gg(x) \cdot u$$

where x generically indicates a vector of state variables of the air charging system 195.

As a consequence, it is still possible to define a vector v of virtual inputs:

$$v = \begin{bmatrix} v_1 \\ v_2 \\ v_3 \\ v_4 \end{bmatrix}$$

and use this virtual input vector v to develop a feedback linearization control law u(x,v) according to the following vector equation:

$$u(x,v) = Gg(x)^{-1} \cdot (v - f(x))$$

such that:

$$\dot{y} = v$$

Hence, also in this case the MIMO non-linear mathematical system has been transformed in an equivalent linear system, where each one of the virtual inputs $v_1$, $v_2$, $v_3$ and $v_4$ is related to only one of the output parameters $\dot{p}_{itv\_us}$, $\dot{p}_x$, $\dot{F}_i$ and $\dot{F}_c$ and vice versa, and where the relation between each one of the virtual inputs and the respective output parameter is a linear relation.

Figure 7:
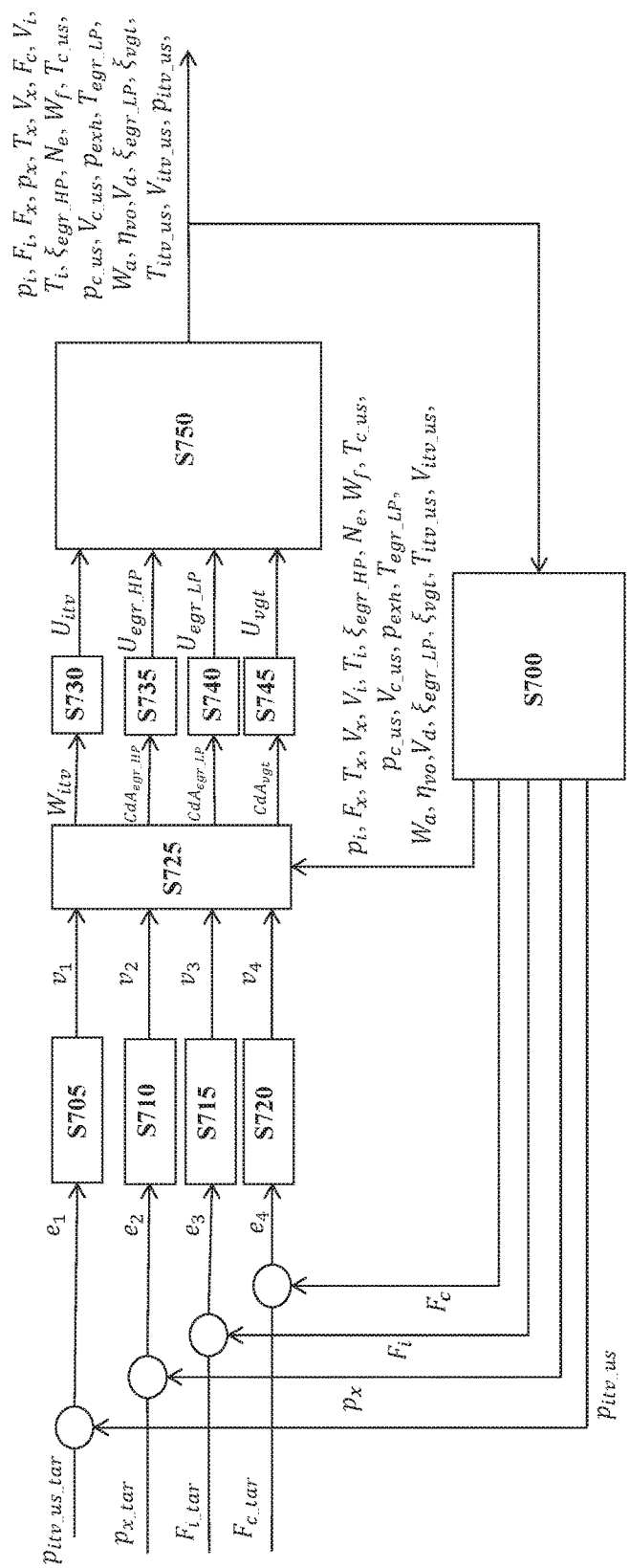
FIG. 7 is a flowchart representing in details a fifth example of a control strategy for an air charging system of the automotive system of FIG. 1.

Taking advantage of this transformation, the ECU 450 may be configured to control the intake valve actuator 332, the HP-EGR valve actuator 322, the VGT actuator 290 and the LP-EGR valve actuator 522 during the operation of the ICE 110, by the linear control procedure as illustrated in FIG. 7.

This control procedure provides for the ECU 450 to monitor (block S700) the value of the output parameters of the air charging system 195, namely the pressure $p_{itv\_us}$ between the intake valve 330 and the compressor 240, the exhaust manifold pressure $p_x$, the residual gas fraction $F_i$ in the intake manifold 200 and the residual gas fraction $F_c$, along with the value of the other observable state variables of the system and constants involved in the MIMO nonlinear mathematical model above, namely the intake manifold inner volume $V_i$, the intake manifold pressure $p_i$, the air temperature $T_i$ within the intake manifold 200, the HP-EGR correction coefficient $\xi_{egr\_HP}$, the exhaust gas temperature $T_x$ within the exhaust manifold 225, the volumetric efficiency $\eta_{v0}$ of the engine, the displacement $V_d$ of the engine, the engine speed $N_e$, the air temperature $T_{itv\_us}$ between the compressor 240 and the intake valve 330, particularly between the intake valve 330 and the intercooler 260, the volume between the intake valve 330 and the compressor 240 $V_{itv\_us}$, the turbine correction factor $\xi_{vgt}$, the exhaust manifold volume $V_x$, the mass flow rate $W_f$ of fuel injected into the combustion chambers 150 of the engine 110, the temperature $T_{c\_us}$ of the air/gas flow in the intake duct 205 upstream of the compressor 240, the residual gas fraction $F_x$, within the exhaust manifold 225, the pressure $p_{c\_us}$ of the air/gas flow in the intake duct 205 upstream of the compressor 240, the volume $V_{c\_us}$ of the intake duct 205 upstream of the compressor 240, the LP-EGR correction coefficient $\xi_{egr\_LP}$, the pressure $p_{exh}$ of the exhaust gas in the exhaust pipe 275 downstream of the aftertreatment devices 280, the temperature $T_{egr\_LP}$ of the exhaust gas in the LP-EGR conduit 500 and the air mass flow rate $W_a$ in the intake duct 205.

In this regard, the value of the exhaust manifold pressure $p_x$ may be measured by a pressure sensor that may be disposed in the exhaust manifold 225 or in the exhaust pipe 275 upstream of the turbine 250. As an alternative, this pressure value may be estimated on the basis of other measurable operating parameters of the ICE 110, for example on the basis of the measurements made by the exhaust pressure and temperature sensors 430. The value of the pressure $p_{itv\_us}$ between the intake valve 330 and the compressor 240 may be measured with a dedicated sensor. The value of intake manifold pressure $p_i$ may be measured by the manifold pressure and temperature sensor 350 located in the intake manifold 200. The value of the intake manifold inner volume $V_i$ is a constant that depends on the geometry of the air charging system. The value of the residual gas fraction $F_i$ may be calculated as a function of the value of an oxygen concentration $O_2$ within the intake manifold 200, according to the equation $F_i=1-O_2$. The oxygen concentration value $O_2$ may be measured by a dedicated sensor disposed in the intake manifold 200 or may be estimated on the basis of other measurable operating parameters of the ICE 110. The value of the residual gas fraction $F_c$ may be determined as a function of the value of an oxygen concentration $O_{2c}$ at the intake duct 205 upstream the compressor 240, according to the equation $F_c=1-O_{2c}$. The compressor oxygen concentration $O_{2c}$ may be estimated on the basis of other measurable operating parameters in the intake duct 205 and in the LP pipe 500. The value of the intake manifold air temperature $T_i$ may be measured (downstream of the intercooler 260) by the manifold pressure and temperature sensor 350 located in the intake manifold 200. The value of the HP-EGR correction coefficient $\xi_{egr\_HP}$ is a nonlinear function of the pressure ratio across the HP-EGR valve. The value of the exhaust manifold gas temperature $T_x$ may be measured by a temperature sensor that may be disposed in the exhaust manifold 225 or in the exhaust pipe 275 upstream of the turbine 250. As an alternative, this tempera-ture value may be estimated on the basis of other measurable operating parameters of the ICE 110, for example on the basis of the measurements made by the exhaust pressure and temperature sensors 430. The value of the volumetric efficiency $\eta_{v0}$ of the engine is a constant that depends on the geometry of the engine. The value of the displacement $V_d$ of the engine is a constant that depends on the geometry of the engine. The value of the engine speed $N_e$ may be measured by the crank position sensor 420. The value of the air temperature $T_{itv\_us}$ may be determined with a dedicated sensor. The value of the volume between the intake valve 330 and the compressor 240 $V_{itv\_us}$ is a constant that depends on the geometry of the air charging system. The volume $V_x$ of the exhaust manifold is a constant that depends on the geometry of that component. The value of the turbine correction factor $\xi_{vgt}$ is a nonlinear function of the pressure ratio across the VGT. The value of the mass flow rate $W_f$ of fuel injected into the combustion chambers 150 of the engine 110 may be provided by the control strategies that operate the fuel injectors 160. The value of the temperature $T_{c\_us}$ of the air/gas flow in the intake duct 205 upstream of the compressor 240 may be determined on the basis of other measurable operating parameters in the intake duct 205 and in the LP pipe 500. The value of the residual gas fraction $F_x$ at the exhaust manifold 225 may be measured by a lambda sensor located in the exhaust pipe 275, upstream of the aftertreatment devices 280. The value of the pressure $p_{c\_us}$ of the air/gas flow in the intake duct 205 upstream of the compressor 240 may be estimated on the basis of other measurable operating parameters in the intake duct 205 and on the LP pipe 500. The value of the volume $V_{c\_us}$ of intake duct upstream of the compressor 240 is a constant that depends on the geometry of the air charging system. The value of the LP-EGR correction coefficient $\xi_{egr\_LP}$ is a nonlinear function of the pressure ratio across the LP-EGR valve. The pressure $p_{exh}$ of the exhaust gas in the exhaust pipe 275 downstream of the aftertreatment devices 280 may be determined on the basis of other measurable operating parameters in the exhaust pipe 275. The value of the temperature $T_{egr\_LP}$ of the exhaust gas in the LP-EGR conduit 500 may be measured by a dedicated sensor located in the duct upstream the LP EGR valve 521. The value of the air mass flow rate $W_a$ in the intake duct 205 may be calculated by the sensor 340.

The monitored values of the output parameters $p_x$, $p_{itv\_us}$, $F_i$ and $F_c$ are fed back and used to calculate an error (i.e. a difference) $e_1$, $e_2$, $e_3$ and $e_4$ between each one of them and a corresponding target value $p_{i\_tar}$, $F_{i\_tar}$ and $p_{x\_tar}$ thereof:

$$e_1=p_{itv\_us\_tar}-p_{itv\_us}$$

$$e_2=p_{x\_tar}-p_x$$

$$e_3=F_{i\_tar}-F_i$$

$$e_4=F_{c\_tar}-F_c$$

The target values $p_{itv\_us\_tar}$, $p_{x\_tar}$, $F_{i\_tar}$ and $F_{c\_tar}$ for the output parameters may be determined by the ECU 450 on the basis of other conventional strategies, for example on the basis of the engine operating point. The first error $e_1$ is then applied as input to a first single-input single-output (SISO) linear controller S705 that yields as output a corresponding value for the first virtual input $v_1$. The second error $e_2$ is applied as input to a second SISO linear controller S710 that yields as output a corresponding value for the second virtual input $v_2$. The third error $e_3$ is applied as input to a third SISO linear controller S715 that yields as output a corresponding value for the third virtual input $v_3$. The fourth error $e_4$ is applied as input to a fourth SISO linear controller 1020 that yields as output a corresponding value for the third virtual input $v_4$.

The four linear controllers S705, S710, S715 and S720 may be for example proportional-integrative (PI) controllers or proportional-integrative-differential (PID) controllers, and are tuned over the equivalent linear system explained above, such as to minimize the respective errors $e_1$, $e_2$, $e_3$ and $e_4$.

The values of the virtual inputs $v_1$, $v_2$, $v_3$ and $v_4$ are then applied to a non-linear calculation module S725, where they are used to calculate corresponding values of the input parameters $W_{itv}$, $CdA_{egr\_HP}$, $CdA_{egr\_LP}$ and $CdA_{vgt}$ of the air charging system 195. In particular, the calculation module S725 may calculate these input parameters with the feedback linearization control law that have been previously explained:

$$u = \begin{bmatrix} W_{itv} \\ CdA_{egr\_HP} \\ CdA_{egr\_LP} \\ CdA_{vgt} \end{bmatrix} = Gg(x)^{-1} \cdot (v - f(x))$$

The calculated value of the air mass flow rate $W_{itv}$ is then applied to a calculation module S730, which may use a mathematical model of the intake valve 330 to yield as output a position $U_{itv}$ of the actuator 332, which corresponds to the calculated value of the air mass flow rate $W_{itv}$. The calculated value of the flow effective area $CdA_{egr\_HP}$ is applied to another calculation module S735, which may use a mathematical model of the HP-EGR valve 320 to yield as output a position $U_{egr\_HP}$ of the actuator 322, which corresponds to the calculated value of the flow effective area $CdA_{egr\_HP}$. The calculated value of the flow effective area $CdA_{egr\_LP}$ is applied to still another calculation module S740, which may use a mathematical model of the LP-EGR valve 520 to yield as output a position $U_{egr\_LP}$ of the actuator 522, which corresponds to the calculated value of the flow effective area $CdA_{egr\_LP}$. The calculated value of the flow effective area $CdA_{vgt}$ of the turbine is applied to still another calculation module S745 of the turbine 250 to yield as output a position $U_{vgt}$ of the actuator 290, which corresponds to the calculated value of the flow effective area $CdA_{vgt}$ of the turbine. The air intake valve actuator 332, the HP-EGR valve actuator 322, the LP-EGR valve actuator 522 and the VGT actuator 290 are finally operated according to the respective calculated position $U_{itv}$, $U_{egr\_LP}$ and $U_{vgt}$ (block S750).

Figure 8:
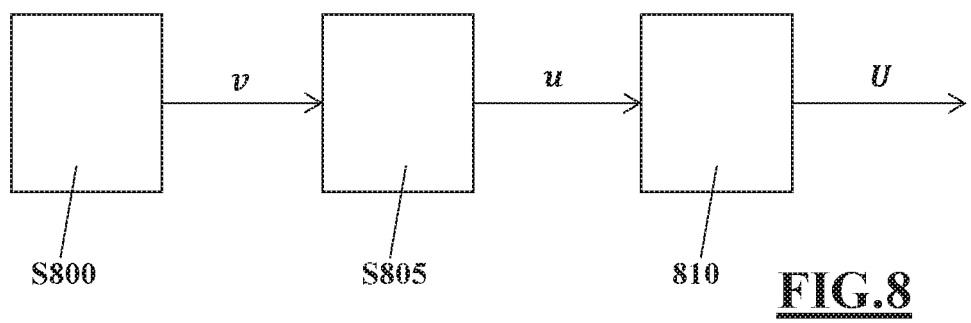
FIG. 8 is a flowchart representing the general control strategy which actuated by all the examples above.

As a matter of fact, all the examples described above demonstrate that the air charging system 195 may be controlled with a feedback linearization control strategy. As schematically represented in FIG. 8, this feedback linearization control strategy generally provides for the ECU 450 to determine (block S800) a vector v containing a value of a plurality of virtual inputs, each of which is in linear relation with only one of the output parameters of the air charging system 195 contained in the vector y. The vector v is applied as input to a feedback linearization law (block S805) of the kind $u(x,v)=Gg(x)^{-1} \cdot (v-Cf(x))$, which provides as output a corresponding vector u of values of "actual" input parameters of the air charging system 195, each of which is then used (block S810) to calculate the position U of a corresponding actuator of the air charging system 195.

As explained in the examples above, during the operation of the internal combustion engine 110, the value of each virtual input may be determined with a dedicated single-input single-output (SISO) linear controller, according to a feedback control mechanism of the related output parameters of the air charging system. In this way, all the actuators of air charging system 195 are controlled together in a coordinate way, thereby improving the accuracy and the time response with which the air charging system 195 adheres to the target values of the output parameters thereof, particularly during the transients.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of controlling the operation of an air charging system of an internal combustion engine having an intake duct, a turbocharger with an exhaust gas turbine and a high-pressure exhaust gas recirculation (EGR) loop, comprising:
    monitoring at least three output parameters of the air charging system, wherein the at least three output parameters includes a manifold pressure and a residual gas function in the internal combustion engine;
    calculating an error between each one of the monitored output parameters and a target value thereof;
    applying each one of the calculated errors to a linear controller for yielding three virtual inputs;
    calculating at least three input parameters for the air charging system, using the three virtual inputs with a non-linear mathematical model of the air charging system configured such that each one of the virtual inputs is in a linear relation with only one of the output parameters and vice versa, wherein the at least three input parameters includes an intake mass flow rate;
    determining a position of a corresponding actuator of the air charging system using each one of the at least three input parameters, wherein the corresponding actuators include a first actuator for an intake valve in the intake duct, a second actuator for a valve in the HP-EGR loop and a third actuator for the turbine; and
    operating each one of the corresponding actuators according to the determined position thereof.

2. The method according to claim 1, wherein the input parameters of the air charging system comprise a parameter indicative of an exhaust mass flow rate through the exhaust gas recirculation valve, a parameter indicative of an air mass flow rate through the air intake valve, and a parameter indicative of an exhaust mass flow rate through a turbine of the variable-geometry turbocharger.

3. The method according to claim 2, wherein the output parameters of the air charging system comprise a parameter indicative of an exhaust manifold pressure, a parameter indicative of an intake manifold pressure and a parameter indicative of a residual gas fraction in the intake manifold.

4. The method according to claim 1, wherein the actuators of the air charging system further comprise an LP-EGR valve actuator.

5. The method according to claim 4, wherein the input parameters of the air charging system comprise a parameter indicative of an air mass flow rate through the air intake valve, a parameter indicative of a flow effective area of the first exhaust gas recirculation valve, a parameter indicative of a power rate of a turbine of the variable-geometry turbocharger, and a parameter indicative of a flow effective area of the second exhaust gas recirculation valve.

6. The method according to claim 5, wherein the output parameters of the air charging system comprise a parameter indicative of a pressure within an intake manifold, a parameter indicative of a residual gas fraction in the intake manifold, a parameter indicative of a compression rate caused by a compressor of the variable-geometry turbocharger, and a parameter indicative of a residual gas fraction in an intake duct upstream of the compressor.

7. The method according to claim 6, wherein the input parameters of the air charging system comprise a parameter indicative of an air mass flow rate through the air intake valve, a parameter indicative of a flow effective area of the first exhaust gas recirculation valve, a parameter indicative of a flow effective area of a turbine of the variable-geometry turbocharger, and a parameter indicative of a flow effective area of the second exhaust gas recirculation valve.

8. The method according to claim 7, wherein the output parameters of the air charging system comprise a parameter indicative of a pressure within an intake manifold, a parameter indicative of a residual gas fraction in the intake manifold, a parameter indicative of a pressure within an intake duct between a compressor of the variable-geometry turbocharger and the air intake valve, and a parameter indicative of a residual gas fraction in the intake duct upstream of the compressor.

9. The method according to claim 7, wherein the output parameters of the air charging system comprise a parameter indicative of a pressure within an intake manifold, a parameter indicative of a residual gas fraction in the intake manifold, a parameter indicative of a pressure within an exhaust manifold, and a parameter indicative of a residual gas fraction in an intake duct upstream of the compressor.

10. The method according to claim 7, wherein the output parameters of the air charging system comprise a parameter indicative of a pressure within an intake duct between a compressor of the variable-geometry turbocharger and the air intake valve, a parameter indicative of a residual gas fraction in the intake manifold, a parameter indicative of a pressure within an exhaust manifold, and a parameter indicative of a residual gas fraction in an intake duct upstream of the compressor.

11. The method according to claim 1, wherein each one of the calculated errors is applied to a proportional-integrative controller for yielding the virtual input.

12. The method according to claim 1, wherein each one of the calculated errors is applied to a proportional-integrative-differential controller for yielding the virtual input.

13. A non-transitory computer readable medium comprising a computer code, which when executed on a computer, is configured to perform the method according to claim 1.

14. An electronic control unit for an air charging system of an internal combustion engine having an intake duct, a turbocharger with an exhaust gas turbine and a high-pressure exhaust gas recirculation (EGR) loop, wherein the electronic control unit is configured to:
monitor at least three output parameters of the air charging system, wherein the at least three output parameters includes a manifold pressure and a residual gas function in the internal combustion engine;
calculate an error between each one of the monitored output parameters and a target value thereof;
apply each one of the calculated errors to a linear controller for yielding three virtual inputs;
calculate at least three input parameters for the air charging system, using the three virtual inputs with a non-linear mathematical model of the air charging system configured such that each one of the virtual inputs is in a linear relation with only one of the output parameters and vice versa, wherein the at least three input parameters includes an intake mass flow rate;
determine a position of a corresponding actuator of the air charging system using each one of the at least three input parameters, wherein the corresponding actuators include a first actuator for an intake valve in the intake duct, a second actuator for a valve in the HP-EGR loop and a third actuator for the turbine; and
operate each one of the corresponding actuators according the determined position thereof.

* * * * *